US010872535B2

(12) United States Patent
Yang

(10) Patent No.: US 10,872,535 B2
(45) Date of Patent: Dec. 22, 2020

(54) FACILITATING FACIAL RECOGNITION, AUGMENTED REALITY, AND VIRTUAL REALITY IN ONLINE TEACHING GROUPS

(71) Applicant: Tutor Group Limited, Taipei (TW)

(72) Inventor: Cheng-Ta Yang, Taipei (TW)

(73) Assignee: Tutor Group Limited, Hong Kong (CN)

( * ) Notice: Subject to any disclaimer, the term of this patent is extended or adjusted under 35 U.S.C. 154(b) by 708 days.

(21) Appl. No.: 15/485,876

(22) Filed: Apr. 12, 2017

(65) Prior Publication Data

US 2017/0221371 A1   Aug. 3, 2017

Related U.S. Application Data

(63) Continuation-in-part of application No. 15/379,449, filed on Dec. 14, 2016, which is a
(Continued)

(30) Foreign Application Priority Data

Jul. 24, 2009   (TW) ............................... 98125108 A

(51) Int. Cl.
*G09G 5/00*   (2006.01)
*G09B 5/06*   (2006.01)
(Continued)

(52) U.S. Cl.
CPC ............. *G09B 5/06* (2013.01); *G06F 3/1454* (2013.01); *G06K 9/00248* (2013.01);
(Continued)

(58) Field of Classification Search
CPC ....... G06T 19/006; G06T 19/00; G06F 3/011; G06F 3/012; G02B 27/017
(Continued)

(56) References Cited

U.S. PATENT DOCUMENTS 5,727,950 A * 3/1998 Cook .................... G09B 19/06
434/350
5,823,788 A   10/1998 Lemelson et al.
(Continued)

FOREIGN PATENT DOCUMENTS

CN    1420448 A    5/2003
CN    1591516 A    3/2005
(Continued)

OTHER PUBLICATIONS

Taiwan Patent Application No. 098125108, "Office Action", Apr. 28, 2014, 5 pages. (including 1 page English translation of marked portion of pp. 2-3 of Office Action ).
(Continued)

*Primary Examiner* — Gordon G Liu
(74) *Attorney, Agent, or Firm* — Carr & Ferrell LLP

(57) ABSTRACT

An online learning management system and method for facilitating facial recognition, augmented reality, and virtual reality learning environments for users distributed across a network is disclosed. The system includes a server and one or more clients coupled by a network, each of the one or more clients having a learning environment. In some embodiments, the server receives and detects a network status of each client and dynamically adjusts a synchronization frequency of each associated learning environment. The learning environment may be an augmented reality learning environment having one or more face masks and/or stickers applied to facial features of a user in a video signal, wherein the server synchronizes the augmented reality learning environment among each client. The learning environment may further be a virtual reality learning environment having one or more 3D objects in a 3D scene, wherein the server synchronizes the virtual reality learning environments.

17 Claims, 18 Drawing Sheets

Related U.S. Application Data continuation-in-part of application No. 15/236,377, filed on Aug. 12, 2016, now Pat. No. 10,586,296, which is a continuation of application No. 12/837,555, filed on Jul. 16, 2010, now abandoned.

(51) Int. Cl.
| | |
|---|---|
| *G06K 9/00* | (2006.01) |
| *G06T 11/60* | (2006.01) |
| *G06T 19/00* | (2011.01) |
| *G06F 3/14* | (2006.01) |
| *H04L 29/06* | (2006.01) |
| *G09B 5/14* | (2006.01) |
| *H04L 12/26* | (2006.01) |
| *G06Q 50/20* | (2012.01) |
| *G09B 5/00* | (2006.01) |
| *G06Q 30/02* | (2012.01) |
| *G09B 7/00* | (2006.01) |
| *H04L 12/18* | (2006.01) |
| *G09B 7/02* | (2006.01) |
| *H04L 12/58* | (2006.01) |
| *G09B 19/06* | (2006.01) |

(52) U.S. Cl.
CPC ............ *G06Q 30/02* (2013.01); *G06Q 50/20* (2013.01); *G06T 11/60* (2013.01); *G06T 19/006* (2013.01); *G09B 5/00* (2013.01); *G09B 5/14* (2013.01); *G09B 7/00* (2013.01); *G09B 7/02* (2013.01); *H04L 12/18* (2013.01); *H04L 43/045* (2013.01); *H04L 43/08* (2013.01); *H04L 51/10* (2013.01); *H04L 51/18* (2013.01); *H04L 65/1083* (2013.01); *H04L 65/403* (2013.01); *H04L 67/38* (2013.01); *G09B 19/06* (2013.01)

(58) Field of Classification Search
USPC ......................................................... 345/633
See application file for complete search history.

(56) References Cited

U.S. PATENT DOCUMENTS

| | | | |
|---|---|---|---|
| 5,957,699 A | 9/1999 | Peterson et al. | |
| 5,978,648 A | 11/1999 | George et al. | |
| 6,024,577 A | 2/2000 | Wadahama et al. | |
| 6,029,043 A | 2/2000 | Ho et al. | |
| 6,064,856 A | 5/2000 | Lee et al. | |
| 6,141,529 A | 10/2000 | Remschel | |
| 6,160,987 A | 12/2000 | Ho et al. | |
| 6,164,974 A | 12/2000 | Carlile et al. | |
| 6,261,103 B1 | 7/2001 | Stephens et al. | |
| 6,282,404 B1 | 8/2001 | Linton | |
| 6,302,698 B1 | 10/2001 | Ziv-El | |
| 6,325,632 B1 | 12/2001 | Chao et al. | |
| 6,505,031 B1 | 1/2003 | Slider | |
| 6,554,618 B1 | 4/2003 | Lockwood | |
| 6,606,744 B1 | 8/2003 | Mikurak | |
| 6,615,020 B2 | 9/2003 | Richter et al. | |
| 6,652,287 B1 | 11/2003 | Strub et al. | |
| RE38,432 E | 2/2004 | Fai et al. | |
| 6,758,754 B1 | 7/2004 | Lavanchy et al. | |
| 6,760,748 B1 | 7/2004 | Hakim | |
| 6,813,474 B2 | 11/2004 | Robinson et al. | |
| 7,124,101 B1 | 10/2006 | Mikurak | |
| 7,305,465 B2 | 12/2007 | Wing et al. | |
| 7,516,180 B2 | 4/2009 | Lacy | |
| 7,860,736 B2 | 12/2010 | Draper et al. | |
| 7,908,602 B2 | 3/2011 | Alcorn et al. | |
| 8,170,465 B2 * | 5/2012 | Griffin | G06Q 10/06311 434/350 |
| 8,172,578 B2 | 5/2012 | Clark et al. | |
| 8,435,038 B2 | 5/2013 | Wilson et al. | |
| 10,586,296 B2 | 3/2020 | Yang | |
| 2002/0055089 A1 | 5/2002 | Scheirer | |
| 2002/0064767 A1 | 5/2002 | McCormick et al. | |
| 2002/0146675 A1 | 10/2002 | Koga et al. | |
| 2002/0182578 A1 | 12/2002 | Rachman et al. | |
| 2002/0188583 A1 | 12/2002 | Rukavina et al. | |
| 2003/0028378 A1 | 2/2003 | August et al. | |
| 2003/0028588 A1 | 2/2003 | McConnell et al. | |
| 2003/0036046 A1 | 2/2003 | Smolover | |
| 2003/0039948 A1 | 2/2003 | Donahue | |
| 2003/0044761 A1 | 3/2003 | Houlihan et al. | |
| 2003/0108856 A1 | 6/2003 | Masuda | |
| 2003/0152904 A1 | 8/2003 | Doty | |
| 2003/0186208 A1 | 10/2003 | Wen et al. | |
| 2004/0002040 A1 | 1/2004 | Foley et al. | |
| 2004/0009461 A1 | 1/2004 | Snyder et al. | |
| 2004/0110119 A1 | 6/2004 | Riconda et al. | |
| 2004/0131999 A1 | 7/2004 | Dresnick | |
| 2004/0139156 A1 | 7/2004 | Matthews et al. | |
| 2004/0153508 A1 | 8/2004 | Alcorn et al. | |
| 2004/0229199 A1 | 11/2004 | Ashley et al. | |
| 2004/0234937 A1 | 11/2004 | Watanabe | |
| 2005/0026131 A1 | 2/2005 | Elzinga et al. | |
| 2006/0035206 A1 | 2/2006 | Clark et al. | |
| 2006/0172274 A1 | 8/2006 | Nolasco | |
| 2006/0174121 A1 | 8/2006 | Omae et al. | |
| 2007/0096894 A1 | 5/2007 | Lemmon | |
| 2008/0043626 A1 * | 2/2008 | Pham | H04L 41/12 370/241 |
| 2008/0172574 A1 | 7/2008 | Fisher | |
| 2009/0035733 A1 | 2/2009 | Meitar et al. | |
| 2009/0202114 A1 * | 8/2009 | Morin | A63F 13/12 382/118 |
| 2009/0307612 A1 | 12/2009 | Singh et al. | |
| 2010/0159432 A1 | 6/2010 | German et al. | |
| 2011/0020781 A1 | 1/2011 | Yang | |
| 2015/0067052 A1 | 3/2015 | Bounds et al. | |
| 2016/0350888 A1 | 12/2016 | Yang | |
| 2017/0098379 A1 | 4/2017 | Yang | |

FOREIGN PATENT DOCUMENTS

| | | |
|---|---|---|
| CN | 101154320 A | 4/2008 |
| CN | 207037604 U | 2/2018 |
| JP | 3212833 U | 10/2017 |
| TW | 200516450 A | 5/2005 |
| TW | I249112 B | 2/2006 |
| TW | 200832298 A | 8/2008 |
| TW | 201104645 A | 2/2011 |
| TW | M549381 U | 9/2017 |
| TW | I622026 B | 4/2018 |

OTHER PUBLICATIONS

Non-final Office Action, dated Jul. 12, 2012, U.S. Appl. No. 12/837,555, filed Jul. 16, 2010.
Final Office Action, dated Jun. 11, 2013, U.S. Appl. No. 12/837,555, filed Jul. 16, 2010.
Non-final Office Action, dated May 21, 2014, U.S. Appl. No. 12/837,555, filed Jul. 16, 2010.
Non-final Office Action, dated Sep. 30, 2014, U.S. Appl. No. 12/837,555, filed Jul. 16, 2010.
Final Office Action, dated Mar. 25, 2015, U.S. Appl. No. 12/837,555, filed Jul. 16, 2010.
Non-final Office Action, dated Sep. 30, 2015, U.S. Appl. No. 12/837,555, filed Jul. 16, 2010.
Final Office Action, dated Apr. 12, 2016, U.S. Appl. No. 12/837,555, filed Jul. 16, 2010.

* cited by examiner

FACILITATING FACIAL RECOGNITION, AUGMENTED REALITY, AND VIRTUAL REALITY IN ONLINE TEACHING GROUPS

CROSS REFERENCE TO RELATED APPLICATIONS

This application is a continuation-in-part of and claims the priority benefit of U.S. application Ser. No. 15/379,449, filed on Dec. 14, 2016, which in turn is a continuation-in-part of and claims the priority benefit of U.S. patent application Ser. No. 15/236,377, filed on Aug. 12, 2016, which in turn is a continuation of and claims the priority benefit of U.S. patent application Ser. No. 12/837,555, filed on Jul. 16, 2010, which claims the priority benefit of Taiwan Patent Application No. 098125108, filed on Jul. 24, 2009, which are hereby incorporated by reference herein in their entirety, including all references and appendices cited therein.

FIELD OF THE INVENTION

The present disclosure relates to methods and systems for facilitating facial recognition, augmented reality, and virtual reality in online teaching groups, and more particularly, it relates to synchronizing multiple learning environments.

BACKGROUND

People usually read books and other information to learn different languages, and the most effective way is to attend language courses in schools. Learners improve their language abilities by communicating with teachers. However, the language courses are usually scheduled for a fixed duration of time, which makes it very inconvenient for learners to arrange and allocate time, daily or weekly, for these courses. As a result, many interested learners eventually abandon their plans to learn a new language.

With the advancement of technology, transmission speed over the Internet has increased throughout the years. Therefore, people are beginning to learn new languages via the Internet due to convenience. No matter where the learners are located, the learners may download video clips recorded by the teachers via the Internet. To achieve maximum learning results, learners may also directly communicate with each other by video software. With this learning method, the learning process is no longer restricted by the place and the time of the language courses. However, learning by watching video clips is very similar to learning by reading books. Furthermore, the function of the video software is limited. As a result, the abovementioned learning method is not as effective as communicating with the teacher in the actual courses.

Furthermore, conventional systems have the disadvantage of being partially or wholly disconnected from the real world. Through traditional video software, learners cannot engage in learning by interacting with real world objects and environments, or even simulations thereof. Accordingly, there is a need for the development of a learning method which provides learners with interactive learning in a realistic learning environment.

SUMMARY

It is an objective of the present disclosure to provide an online interactive learning and managing system for users to learn interactively via the Internet and to provide an augmented reality and/or virtual reality learning environment.

Some embodiments of the present technology include methods for generating and synchronizing an augmented reality environment, which may include: rendering an augmented reality learning environment through a graphical user interface, receiving one or more user inputs, transforming the user inputs into augmented reality identification information, sending synchronization information including network status information and the augmented reality identification information, receiving updated synchronization information, and updating the augmented reality learning environment based on the received updated synchronization information.

Various embodiments of the present technology include methods for generating and synchronizing a virtual reality learning environment, which may include: rendering a virtual reality learning environment through a graphical user interface, receiving one or more user inputs, transforming the user inputs into object position and orientation information, sending synchronization information including network status information and the object position and orientation information, receiving updated synchronization information, and updating the virtual reality learning environment based on the received synchronization information.

Other embodiments of the present technology include synchronizing learning environments of one or more clients, which may include: receiving synchronization information from one or more clients, determining a controlling client of the one or more clients, updating learning environment information for the one or more clients based on synchronization information received from the controlling client, determining a synchronization frequency of each of the one or more clients based on network status information, and sending updated synchronization information including the updated learning environment information and the determined synchronization frequency to the one or more clients.

BRIEF DESCRIPTION OF THE DRAWINGS

These and other objectives and advantages of the present disclosure will become apparent from the following description of the accompanying drawings, which disclose several embodiments of the present disclosure. It is to be understood that the drawings are to be used for purposes of illustration only, and not as a definition of the invention. In the drawings, similar reference numerals denote similar elements throughout the several views.

DETAILED DESCRIPTION

Figure 1:
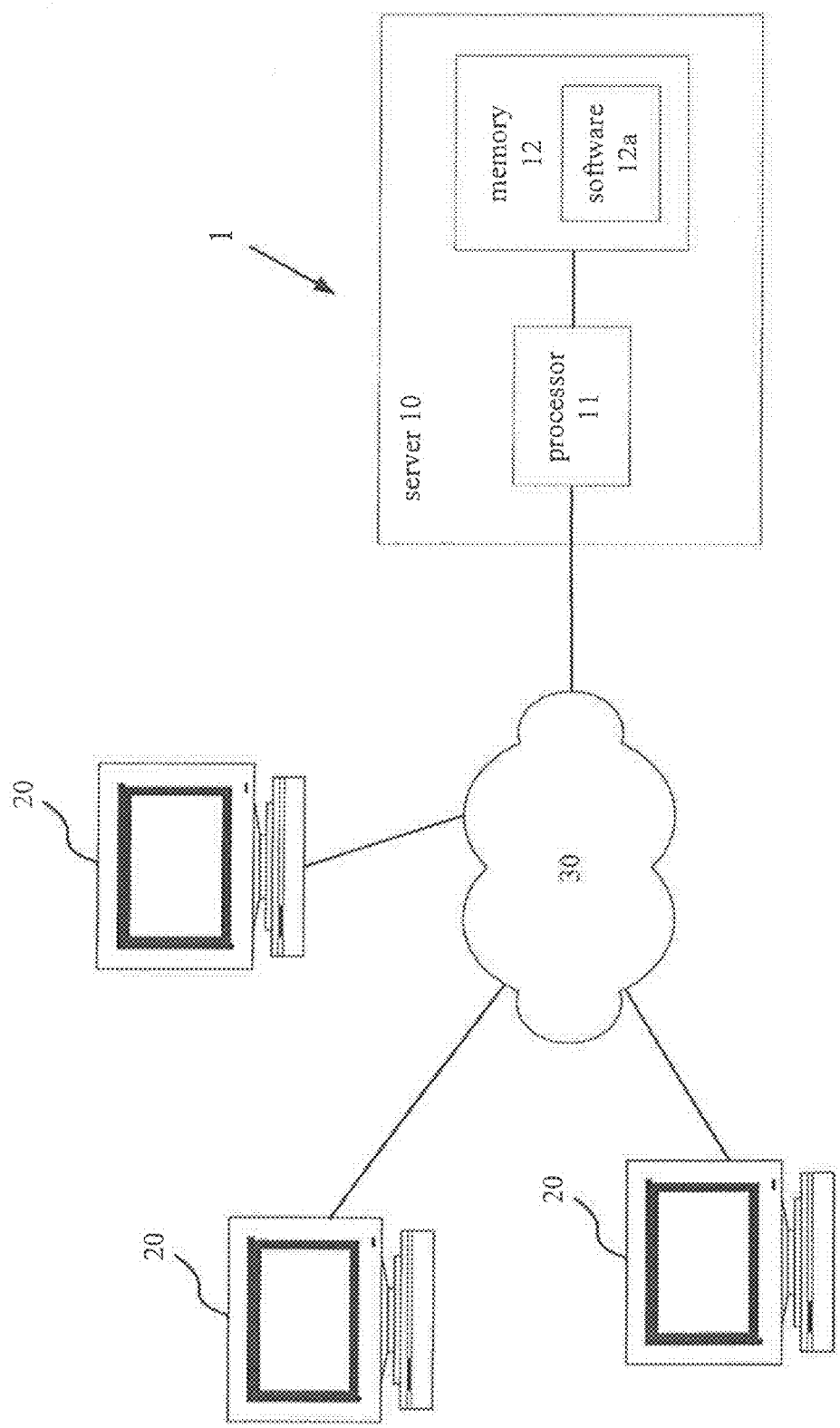
FIG. 1 is a schematic diagram of the online interactive learning and managing system of the present disclosure.

Please refer to FIG. 1, which is a schematic diagram of an online interactive learning and managing system of the present disclosure. As shown in FIG. 1, an online interactive learning and managing system 1 of the present disclosure comprises a server 10. A plurality of users may log in the server 10 via the Internet 30 with each user's computer 20, and then may utilize the online interactive learning and managing system 1 of the present disclosure to proceed with interactive learning. The server 10 comprises a processor 11 and a memory 12 electrically coupled with the processor 11. The memory 12 comprises a software program 12a, which is executed by the processor 11 and activates the learning and managing functions.

In one or more embodiments, the software program 12a is coded in flash language. Each user needs only to use the computer 20 to log into the server 10 of the online interactive learning and managing system 1 via the Internet. The related operational interfaces may be formed and displayed via the computer 20. Therefore, each user does not have to install corresponding software in the computer 20. However, the present disclosure is not restricted to this method.

Figure 2:
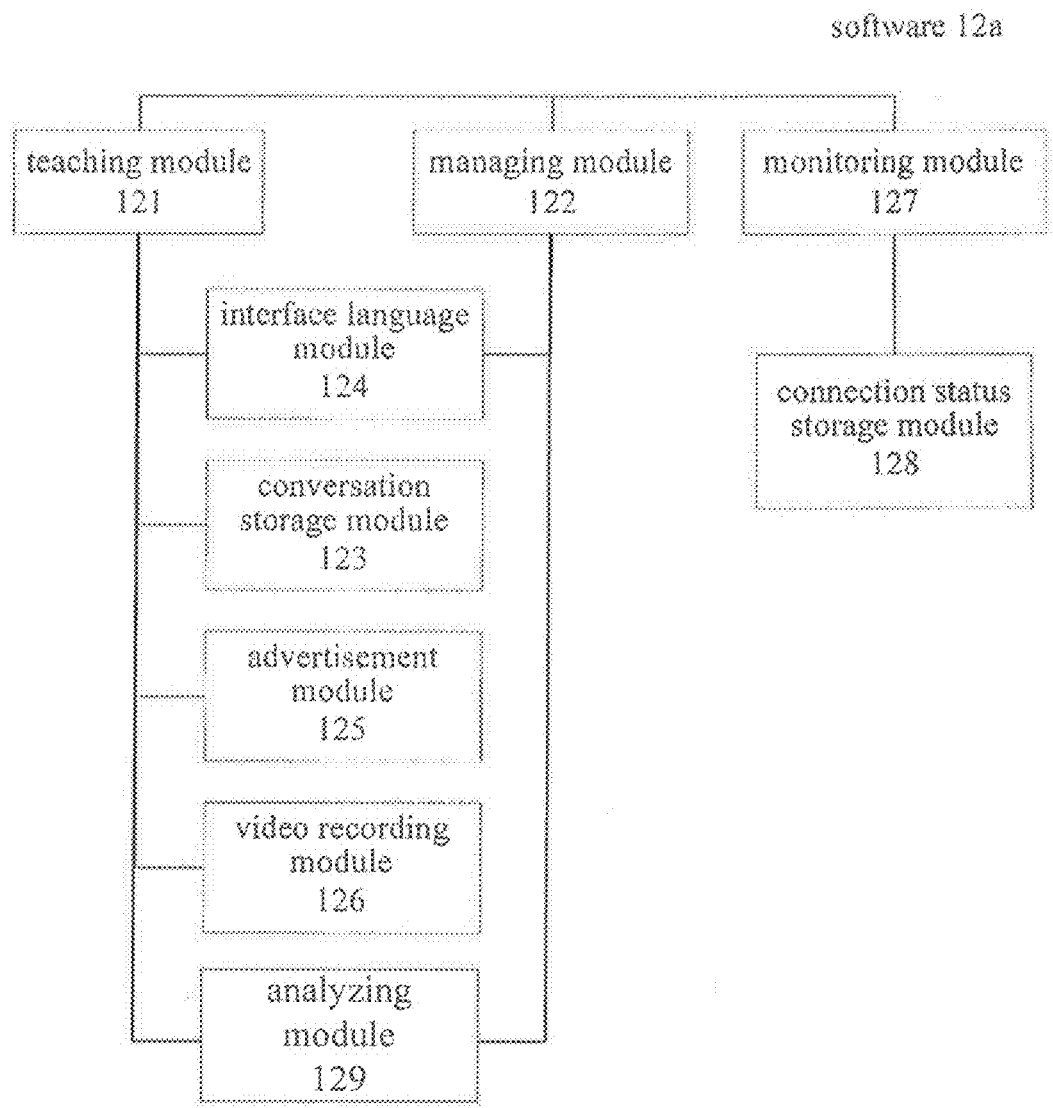
FIG. 2 is a schematic diagram showing a composition structure of a software program of the online interactive learning and managing system of the present disclosure.
Figure 3:
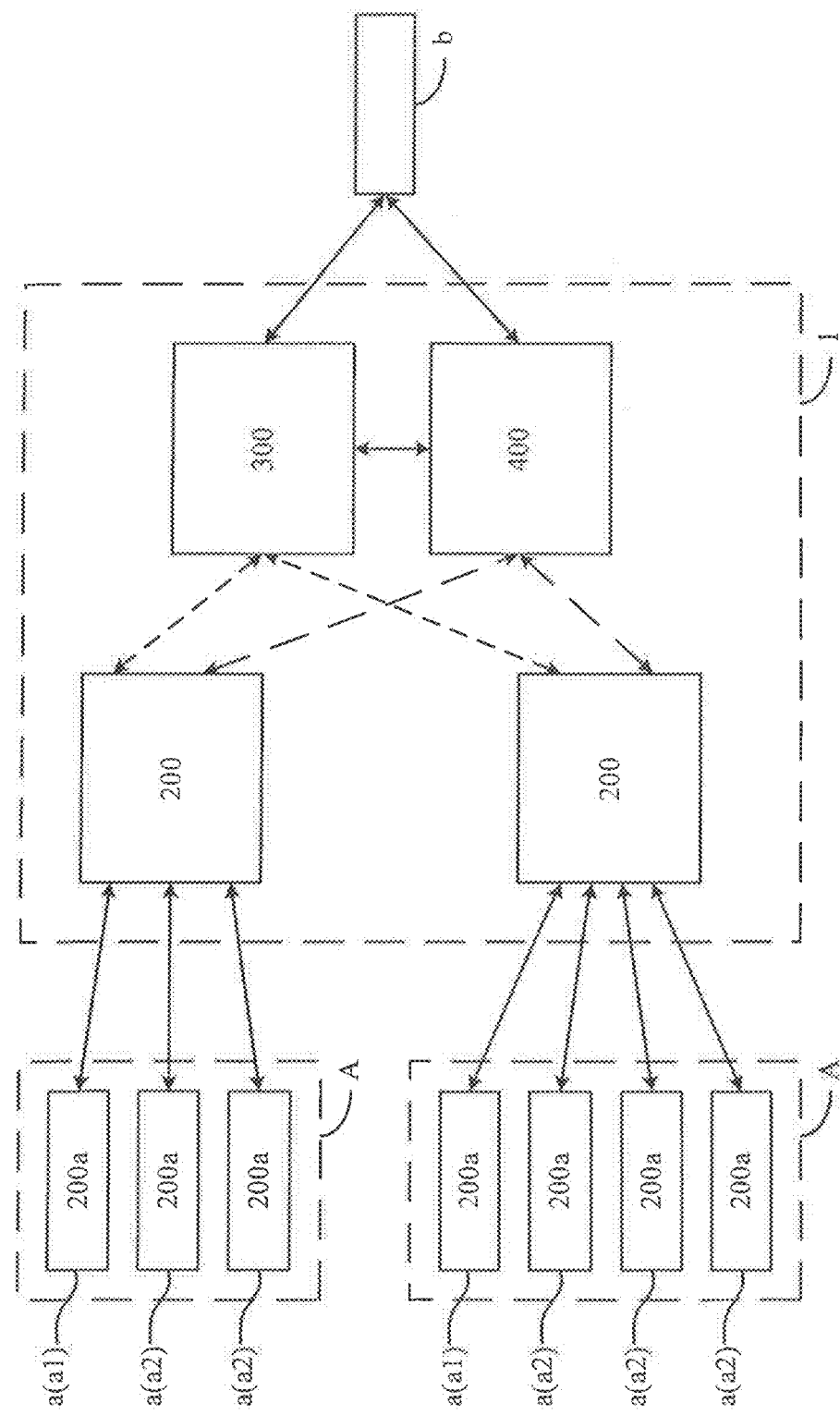
FIG. 3 is a schematic diagram showing an established connection status of the online interactive learning and managing system of the present disclosure.

Please refer to FIG. 2 and FIG. 3. FIG. 2 is a schematic diagram showing a composition structure of a software program 12a of the online interactive learning and managing system 1. FIG. 3 is a schematic diagram showing an established connection status of the online interactive learning and managing system 1. Information of each user is stored in the respective computer 20 of the user. When a user "a" logs into the online interactive learning managing system 1, the software program 12a will retrieve the information of the user from the computer 20 corresponding to the user, and will allocate the user "a" to a predetermined teaching group "A" after comparing the information with course category data. The course category data is pre-loaded into the memory 12. All users may be allocated to form at least one teaching group "A" according to at least one of: the number of users "a," different language levels of the users, and different identities of the users. Each teaching group "A" is composed of a plurality of users "a," and each teaching group "A" comprises one teacher "a1" and at least one learner "a2." The related technique of categorizing the users according to the information of each user is disclosed in Taiwan patent No. I249112.

As shown in FIG. 2 and FIG. 3, the software program 12a comprises a teaching module 121, a managing module 122, and an analyzing module 129. The teaching module 121 forms an operation interface 200 corresponding to each teaching group "A," such that each teaching group "A" may proceed with interactive learning. The information of each user "a" comprises personal settings. When the operation interface 200 is formed, the operation interface 200 loads the personal settings of each user "a" and forms a personalized operation interface 200a. The operation interface 200 displays the personalized operation interface 200a on each respective computer 20. Each user may communicate and learn with other users of the same teaching group "A" via the personalized interface 200a.

Furthermore, according to the different personal settings that are loaded, e.g. the personal settings of a teacher or a learner, the teaching module 121 may categorize each personalized operation interface 200a into a teacher's operational interface or a learner's operational interface. The different operational interfaces for teachers and learners have respective interface operation authorization levels. Via the operation interface 200, the users in the same teaching group can see each other via video and talk to each other.

The managing module 122 forms a managing interface 300, which allows an administrator "b" to manage the plurality of users "a" and to control the teaching and learning situation of each teaching group "A." When something needs to be communicated between the administrator "b" and a user "a," the administrator "b" and the user "a" may communicate with each other via the managing interface 300 and the personalized operation interface 200a, respectively. The user "a" may send messages via the personalized operation interface 200a, and the managing module 122 may receive messages for display on the managing interface 300 for notifying the administrator "b." The administrator "b" may also send messages via the managing interface 300, and the teaching module 121 may receive the messages for display on the personalized operation interface 200a of any designated single or multiple users "a."

In one or more embodiments, the analyzing module 129 produces speaking information corresponding to a user. The analyzing module 129 receives an audio signal from a microphone coupled to the computer 20 of the user. The analyzing module 129 determines whether or not the user is speaking, via voice activity detection or other voice recognition method, versus when the audio signal only comprises background noise. The analyzing module 129 calculates a length of time that the user speaks based on the voice activity detection. The analyzing module 129 compares the length of time that the user speaks with a length of time other users speak. It is to be understood that the length of time other users speak is similarly calculated by the analyzing module 129 based upon at least one audio signal received from a microphone coupled to the computer 20 of each respective user. The analyzing module 129 produces the speaking information according to the results of the comparison. The speaking information may further include a ratio of a speaking time of the user to a speaking time of the teacher per minute, as well as a ratio of the speaking time of the user to a speaking time of a different user per minute.

The analyzing module 129 transmits the speaking information to the teaching module 121 and the managing module 122. According to the speaking information, the teacher, the learner, and the administrator may improve the teaching and learning effects. The speaking information is updated in real time, so the user may improve a teaching or learning way immediately.

In some embodiments, the analyzing module 129 further analyzes the audio signal and converts user speech contained within the audio signal into a speech-to-text transcript. The speaking information may also include the speech-to-text transcript. In certain embodiments, the analyzing module 129 detects a language of the user. The analyzing module 129 then translates the transcript into the detected language or into a different language. Furthermore, the analyzing module 129 may auto-tag certain terms or text within the speech-to-text transcript.

In one or more embodiments, the analyzing module 129 produces video information corresponding to a user. In various embodiments, the analyzing module 129 receives a video signal from a camera coupled to the computer 20 of the user. A user, via the personalized operation interface 200A, may activate a video function in which a video received from the camera is transmitted to the personalized operation interface 200A of other users in real time. In various embodiments, the analyzing module 129 analyzes the face of the user via facial recognition. The analyzing module 129 determines whether or not the user is causing a disturbance (e.g. determining whether or not the user is paying attention, has fallen asleep, or is talking) based on the analysis via the facial recognition. In certain embodiments, the analyzing module 129 generates a notifying message indicative of the disturbance of the user and transmits the notifying message to the managing module 122. Furthermore, the analyzing module 129 produces the video information based on the analysis via the facial recognition and transmits the video information to the teaching module 121 and the managing module 122. According to the video information, the teacher, the learner, and the administrator may improve the teaching and learning effects.

In some embodiments, the analyzing module 129 determines whether a microphone or audio of the computer 20 of the user is working properly based on at least one of the video information and the speaking information. For example, in one or more embodiments, the analyzing module 129 determines both that a user is talking based on the video information, and also that no audio signal was received from the microphone of the user (e.g. the computer 20 of the user transmitted no audio signal, or the received audio signal was empty). The determination indicates an issue with the microphone. Based on the determination, the analyzing module 129 thus automatically generates a notifying message indicative of the microphone issue. The analyzing module 129 then transmits the notifying message to the managing module 122. In other embodiments, the analyzing module 129 can send the notifying message directly to the user.

In some embodiments, the personal settings include at least one of interface function settings, data input authorization settings, and user information settings. The interface function settings correspond to the settings of the personalized operation interface 200a displayed on the user's computer 20. The interface function settings may comprise interface language settings, time settings, video settings, and sound settings. The data input authorization settings are related to the input operation authorization settings of the personal operation interface 200a for the user "a." The input operating authorization settings comprise a character input authorization, a sound input authorization, or an interaction input authorization. The user information settings include the display name, hobbies, and other related settings of the user "a."

When the user "a" logs into the on-line interactive learning and managing system 1, the personal settings of the user "a" are also loaded. The language displayed on the personalized operation interface 200a may be changed according to different interface language settings. For example, the interface language may be displayed in, at least, simplified Chinese characters, traditional Chinese characters, or English letters. The time settings determine the time information being displayed on the personalized operation interface 200a. According to the different time settings, a local time of the user or/and a local time of the server may be displayed separately or simultaneously. It is convenient for the user to check the correct timing of the course from wherever the user logs in.

The video settings determine whether a video camera of the user is on or off, and whether to display the video images received from the video camera on the personalized operation interface 200a. The sound settings determine whether a microphone of the user is on or off, and determine a volume of sound from an output device (e.g. amplifiers), or an input device (e.g. microphones). The personalized operation interface 200a may be customized according to the interface function settings so that each user "a" may learn interactively via an interface with which he or she is most familiar.

The interface function settings may be changed through the personal operation interface 200a. The software program 12a may automatically save the changed interface function settings as the personal settings. The software program 12a will load the new personal settings, and will update the personal operation interface 200a on the next occasion when the user "a" logs into the online interactive learning and managing system 1.

The character input authorization of the data input authorization settings determines whether the user "a" is able to input characters in the personalized operation interface 200a. The sound input authorization determines whether the user "a" is able to transmit a sound signal through the microphone to other users "a" of the same teaching group "A." The interaction input authorization determines whether the user "a" is able to use teaching display data (such as teaching materials) for operating interactively via the personalized operation interface 200a. The personal settings corresponding to different identities of the users are different, so the data input authorization of the personalized operation interface 200a for each user "a" is different. For example, when the user "a" is a teacher "a1," the default of all of the data input authorization of the user "a" may be activated for teaching. When the user "a" is a learner "a2," the user need only to listen, talk, and input characters to communicate with teacher "a1" and other learners "a2." The learner "a2" may not need to utilize the interaction input authorization, which is only utilized by the teacher "a1," and the default of the interaction input authorization should be closed for learner "a2." The default of the data input authorization in the above description may be adjusted according to different system requirements. However the present disclosure is not restricted to this method.

Furthermore, when the user "a" logs in, a nickname defined by the user "a" may be displayed on the personalized operation interface 200a according to the user information settings. Each user "a" may address one another with said nickname. The nickname of the user "a" is distinct from the account name of the user "a."

Figure 4:
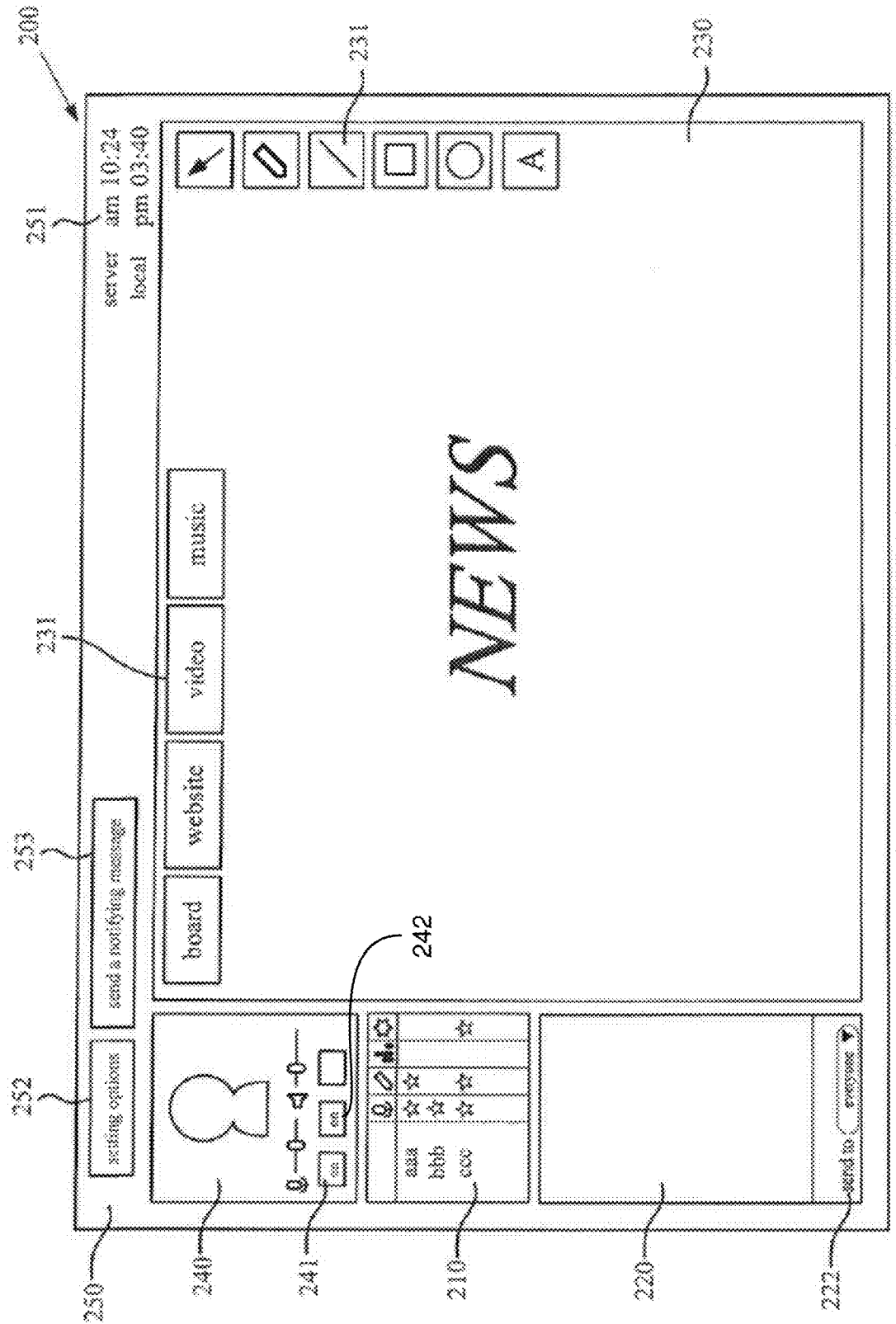
FIG. 4 is a schematic diagram showing a personalized operation interface of the online interactive learning and managing system of the present disclosure.

Please refer to FIG. 2 and FIG. 4. FIG. 4 is a schematic diagram showing a personalized operation interface 200a of the online interactive learning and managing system of the present disclosure. As shown in FIG. 2 and FIG. 4, each personalized operation interface 200a formed by the teaching module 121 comprises a status display area 210, a real-time communication area 220, an interactive display area 230, a video display area 240, and an interface function settings area 250.

The status display area 210 displays status information of each user, the status information comprising a user connection status, a user identity status, or an input authorization status. The user connection status determines whether an Internet connection of the computer 20 of the user is stable. The user identity status is used for confirming an identity of the user. The input authorization status determines the data input authorization of the user. Accordingly, the status information of each user of the same teaching group may be displayed in the status display area 210. The status display area 210 of the teacher's operation interface 200*a* also displays the speaking information and the video information. According to the speaking information and the video information, the teacher can decide to change or maintain the teaching style and focus attention on a learner who is speaking less or who is not paying attention. However, the present disclosure is not only limited to these types of information.

The real-time communication area 220 displays the text messages typed by the users of the same teaching group, which allows two or more users to communicate with each other. The text messages typed by each user in the real-time communication area 220 may be sent via a function option 222 to specific users, such as the teacher or a specific learner, or to all users of the same teaching group, and the messages may be sent in a private or public manner. The user may also communicate with the administrator directly through text messages. As shown in FIG. 2 and FIG. 4 of the on-line interactive learning and managing system 1, the software program 12*a* further comprises a conversation storage module 123, which is used to save all message conversations that each user has entered as text in the real-time communication area 220 of the personalized operation interface 200*a*. As a result, the text messages of the conversations can be searched in the future if needed.

In some embodiments, the interactive display area 230 provides a digital white-board, which is collaboratively shared between users. The interactive display area 230 may comprise multiple displays, each display having at least one of the speech-to-text transcripts, the digital white-board, Internet web pages, etc. The users create various layouts for the displays, via the personalized operation interface 200A, the displays being movable and resizable according to the user's preferences. The teaching module 121 may load teaching display data and display the data on the interactive display area 230 of the personalized operation interface 200*a*.

In certain embodiments, the teaching display data is provided by the teacher with the interaction input authorization. The teaching display data may be selected and operated (such as inputting characters, footnoting, or drawing lines on the teaching display data) by a function bar 231 of the interactive display area 230. The learner whose interaction input authorization is active may also use the related function of the interactive display area 230. The teaching display data may comprise documents (such as documents generated in word-processing software or digital slideshow files), web data, or multimedia files (such as video or audio files). Furthermore, the teaching display data corresponding to each teaching group may be pre-loaded by the system onto the interactive display area 230 of each personalized operation interface 200*a*, and each learner may preview the teaching display data.

The video display area 240 displays video images captured from a camera coupled to the teacher's computer. For example, a webcam may capture a real-time video of the teacher to simulate the situation of face-to-face teaching and learning. The video display area 240 comprises a video switch 241, which allows users to activate or disable at least one of the video images displayed on the video display area 240 and the camera of the user.

The video display area 240 further comprises a speaking switch 242. When the user turns the speaking switch 242 to an on state, the teaching group can hear the voice from the user's microphone. In contrast, when the speaking switch 242 is in the off state, the teaching group cannot hear any voice from the user's microphone. The video display area 240 allows users to activate or disable the audio input/output, and adjust the volume of the audio input/output. For example, if the user activates the video image while the network is congested, the image transmission may be delayed. In such a case, the user may choose to disable the video images and audio in order to allow the personalized operation interface 200*a* to operate more swiftly.

The interface function settings area 250 provides options and display of some interface functions, and the functions comprise a time display 251, an interface function option 252, and a communication assistance function option 253. The time display 251 is set in accordance with the personal settings, and the corresponding time is displayed. The user may check the actual time of the course, independent of where the user is located. The interface function option 252 may be used for adjusting the related functions of the personalized interface 200*a*, and it comprises the options of the interface language settings or the time settings. The user may scroll down the option list to choose the options for the adjustments.

The software program 12*a* further comprises an interface language module 124, and the interface language module 124 stores multiple interface languages. The language displayed on the personalized operation interface 200*a* may be changed via the interface function settings area 250 of the personalized operation interface 200*a*. For example, the predefined language setting in the personalized operation interface 200*a* is traditional Chinese. When a user's first language is English, the language on the personalized operation interface 200*a* may be changed to English by the interface function settings area 250. The change of the interface language settings is stored in the user's personal settings, and the personalized operation interface 200*a* will retain its English interface if the language setting remains unchanged.

The communication assistance function option 253 allows the learners to respond to the teacher regarding the problems in learning, or allows the learners or the teacher to respond to the administrator regarding the problems in using the interface, and reminds the administrator to respond to the problems. Using the communication with the administrator as an example, any learner or teacher may choose the most appropriate option of a set of options via the communication assistance function option 253 when a problem arises (such as if there are delays in communication, or if the audio cannot be heard), or directly type text messages to notify the administrator regarding the problem. A notifying message may be sent to the managing module 122 according to the messages typed or the option chosen by any learner or teacher via the personalized operation interface 200*a*. Then, the managing module 122 may display a prompting message corresponding to the notifying message on the managing interface 300 to remind the administrator to solve the problem.

In various embodiments, the teacher's operation interface comprises at least one control coupled to the data input authorization of each learner. The teacher may alter the data input authorization setting of any learner's operation interface via the teacher's operation interface to ensure the convenience of teaching and to prevent some users from trying to disturb the course. The teacher may evaluate the situation of the course and change any learner's data input authorization settings via the teacher's operation interface. For example, when a learner wants to share a document or a video during the course, the teacher may activate the learner's interaction input authorization such that the learners may provide and display related files in the interactive display area 230. If a learner attempts to disrupt the course by sending inappropriate, vulgar, or irrelevant messages in the real-time communication area 220, the teacher may disable that learner's character input authorization to stop the disruption.

The software program 12*a* further comprises an advertisement module 125 that stores multiple advertisement data. When the personalized operation interface 200*a* is formed, the software program 12*a* combines at least one advertisement data with the corresponding personalized operation interface 200*a* via the advertisement module 125. The user may see the at least one advertisement data when using the personalized operation interface 200*a*. The advertisement module 125 chooses a suitable advertisement data to combine with each personalized operation interface 200*a* according to special events or the user's personal settings, e.g. the teaching group for each user, identity, or personal information. For example, a user may store data on hobbies in the personal information settings, such as "movies" or "electronic products." Accordingly, the advertisement module 125 may choose a corresponding movie trailer or an advertisement for electronic products, and combine it with the user's personalized operation interface 200*a*, so that the users will receive additional information during the course.

The software program 12*a* further comprises a video recording module 126, which is used for recording the teaching process of each teaching group via the operating interface 200 to form recording files. In various embodiments, the video recording module 126 first receives a signal from the teacher's computer that the camera has been activated. In response, the video recording module 126 records video of the teacher into a memory, and transmits the video to at least one learner. In response to the teaching module 121 forming an operation interface 200 for any respective teaching group, the video recording module 126 activates and records the teaching process of the teaching group, as well as recording the operations and video data of the operation interface 200. Therefore, the learners who could not attend the course or want to review the class may view the recording files of the course after the course has ended. Furthermore, when the users log into the server to view the recording files, the advertisement module 125 may also choose a suitable advertisement data according to each user's personal information settings and insert the advertisement data into the recording files.

Figure 5A:
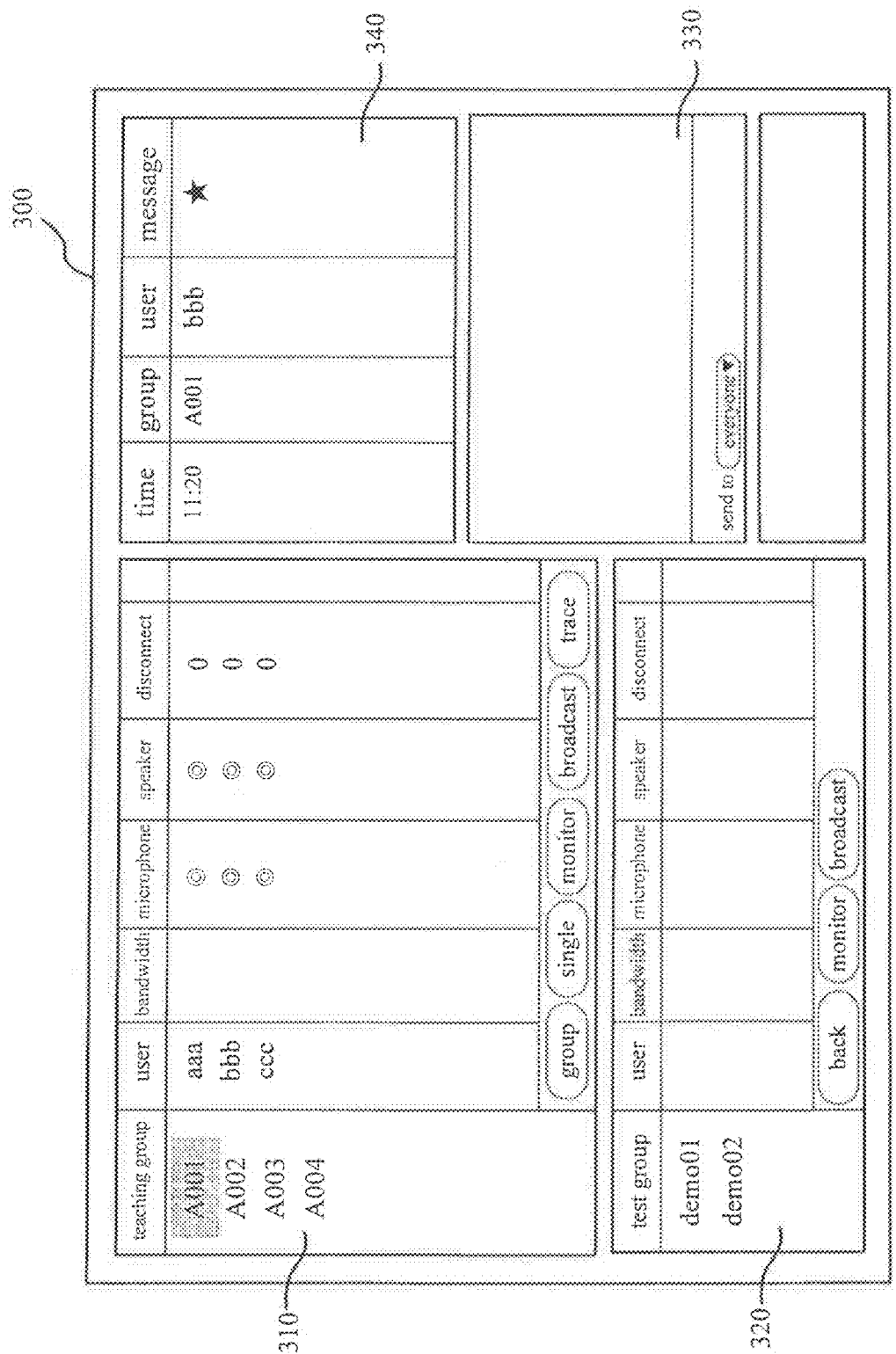
FIG. 5(a) and FIG. 5(b) are schematic diagrams showing a managing interface of the online interactive learning and managing system of the present disclosure.
Figure 5B:
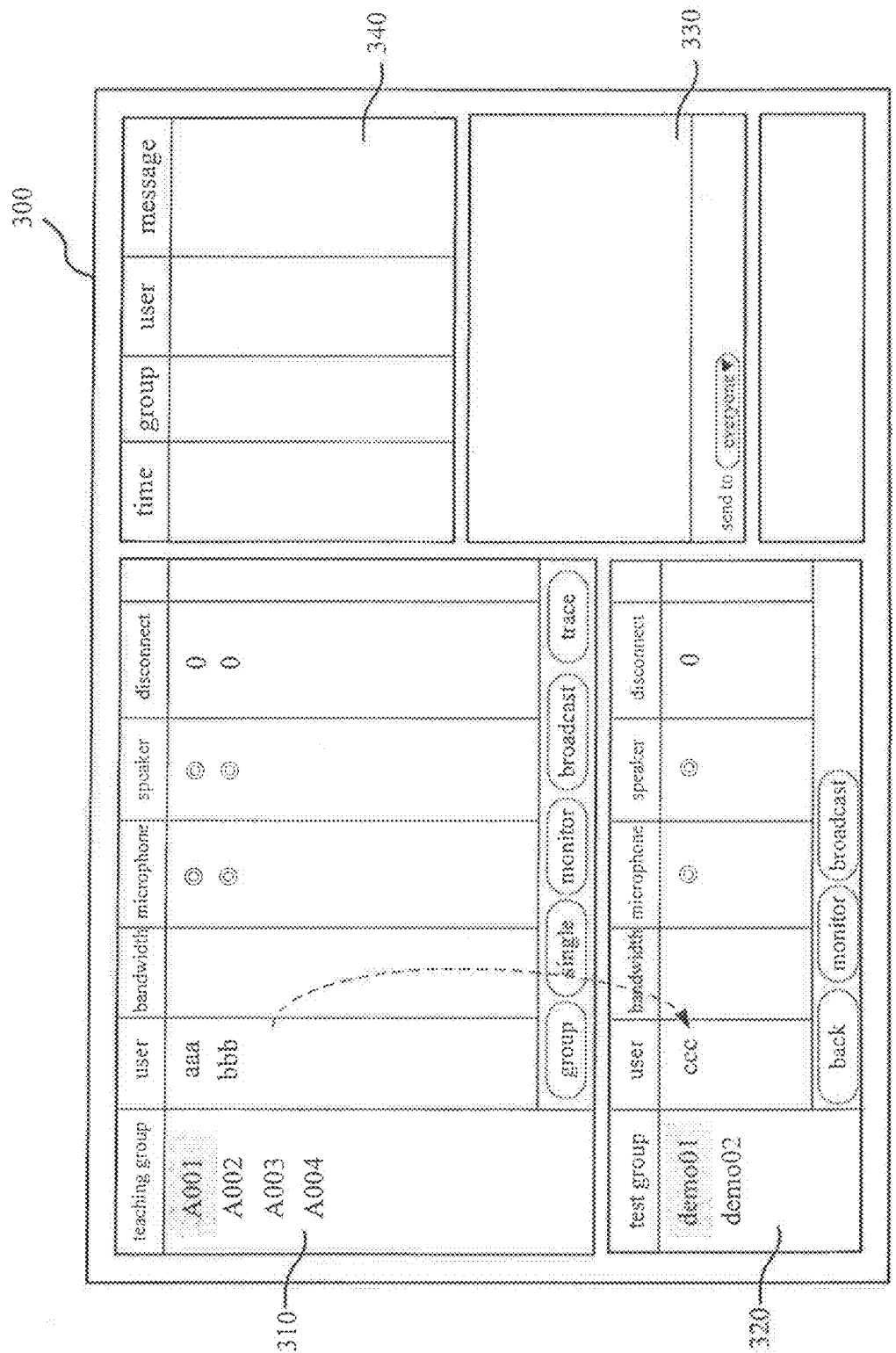

Please refer to FIG. 2, FIG. 5(*a*) and FIG. 5(*b*). FIG. 5(*a*) and FIG. 5(*b*) are schematic diagrams showing a managing interface 300 of the online interactive learning and managing system 1 of the present disclosure. As shown in FIG. 2 and FIG. 5(*a*), in various embodiments a managing interface 300 is formed when an administrator's account is logged into the online interactive learning and managing system 1. The administrator may monitor the situation of each teaching group or each user by the managing interface 300. The administrator may communicate with each user to help them to solve problems in operating the interface by the managing interface 300. The managing interface 300 comprises a teaching group managing area 310, a test group managing area 320, a real-time communication area 330, and a message display area 340. The teaching group managing area 310 displays status information of all the current users of each teaching group for managing by the administrator. The status information comprises a connection status of each user and a sound input/output status.

In some embodiments, the managing module 122 allows the administrator to monitor any teaching group or any user on the managing interface 300 and the current course situation of the teaching group or the user. When the administrator determines that a user disturbs the course, the administrator may input a command via the managing interface 300 and remove the user from the teaching group. In response to the command, the personalized operation interface 200*a* of the user may be closed. Conversely, the administrator may also restore a removed user back into the teaching group and activate the user's personalized operation interface 200*a* in order to continue with the course.

The managing module 122 receives one or more notifying messages from the analyzing module 129 indicative of microphone issues, classroom disturbances, or video issues. The managing module 122 generates a notifying message to the user inquiring about the particular issue. The user can then use the communication assistance function option 253 to respond to the notifying message and communicate with the teacher and the administrator to resolve the issue. The managing module 122 may automatically remove the user from the teaching group so that the issue may be resolved. The managing module 122 may subsequently restore a removed user back into the teaching group and activate the user's personalized operation interface 200*a* in order to continue with the course once the issue has been resolved. A monitoring module 127 allows the administrator to continue monitoring the teaching group to further remedy the situation, as will be described in greater detail below.

Please refer to FIG. 5(*a*) and FIG. 5(*b*). The test group managing area 320 is used to test the user's usage status. The test group managing area 320 may preset at least one test group (demo01 and demo02 as shown in FIG. 5(*a*) and FIG. 5(*b*)). When a user ccc within the teaching group encounters an operation problem (such as unclear audio or an unstable connection), the managing module 122 may remove the user ccc from its corresponding teaching group A001 of the teaching group managing area 310 and then place the user ccc into the test group demo01 of the test group managing area 320 according to the operation of the managing interface 300. At this point, the managing module 122 may disable the personalized operation interface 200*a* of the user ccc so that the administrator may proceed with related status testing for the user ccc to solve the problem. When the problem is solved, the administrator will indicate to the managing module 122 that the problem is solved. The managing module 122 receives input indicating that the problem has been resolved, and in response moves the user ccc from the test group demo01 of the test group managing area 320 back into the teaching group A001 of the teaching group managing area 310. Then the personalized operation interface 200*a* of the user ccc may be enabled for continuing with the course.

The real-time communication area 330 displays the messages typed by each administrator so that the administrators are able to communicate with one another. In various embodiments, multiple administrators manage a portion of the teaching groups if multiple learners log into the course at the same time. Therefore, the real-time communication area 330 provides a way for the administrators to communicate with one another and support one another in real time. The messages typed by any administrator in the real-time communication area 330 may also be sent to any specific user, and text messages sent from any personalized operation interface 200a may be displayed via the real-time communication area 330. Therefore, the user may privately communicate with the administrator.

The message display area 340 is used to display prompting messages. As shown in FIG. 5(a), when a user has a system operational problem or other unsolvable problems, the user may send a notification message via the communication assistance function option 253 of the personalized operation interface 200a. The notification message may be transmitted over the Internet and then received by the managing module 122. The managing module 122 may display a prompting message corresponding to the notification message via the message display area 340 of the managing interface 300. The prompting message includes which user has the problem and a description of the problem. The administrator may directly contact the user via the managing interface 300, or move the user into the test group for testing and analyze the problem by the abovementioned function. The prompting message displayed on the message display area 340 may display the user information of the user who sent the message, and display the descriptions or drawings of the problem (as indicated by a star sign as shown in FIG. 5(a) under "message"), such that the administrator may understand the problem immediately. As a result, the online interactive learning and managing system 1 of the present disclosure is able to solve the user's problem without disturbing the course.

When a system announcement (or an alert) needs to be broadcast to all the logged-in users, the administrator may send an announcement data via the managing interface 300. In some embodiments, the announcement data is received and processed by the teaching module 121 for display via each personalized operation interface 200a to notify all users.

As shown in FIG. 2 and FIG. 3, the software program 12a further comprises a monitoring module 127, which creates a monitoring interface 400 to help the administrator with controlling the status of the server 10 and the connection status of each user. The administrator may monitor and adjust the related settings of the system via the monitoring interface 400, e.g. online bandwidth settings, video size adjustments, a number of activated classes, or a number of users currently online. The monitoring module 127 further comprises a connection status storage module 128, which monitors the connection status of each user and stores each user's connection status data as a connection status record respectively for searching. The connection status data comprises one or more of a user connection address, a time record of log-in, log-out, an Internet flow bandwidth, and abnormal data.

In some embodiments, the monitoring module 127 monitors and analyzes the connection status of a computer of a user. The monitoring module 127 determines, based on the monitoring and analysis, if a user's connection status of a user's computer is unstable or if the user's computer is not connected to the on-line interactive learning and managing system 1. The monitoring module 127 retrieves connection status data of a single user or multiple users of the teaching group from the managing interface 300 or the monitoring interface 400. Once a connection status problem has been detected, the monitoring module can send a notifying message indicative of the connection status problem to the teaching module 121 and the managing module 122 such that the issue can be resolved. Accordingly, the problem may be identified as one that takes place at the user's side or one that takes place at the server's side by the connection status data to help to solve the problem.

Figure 6:
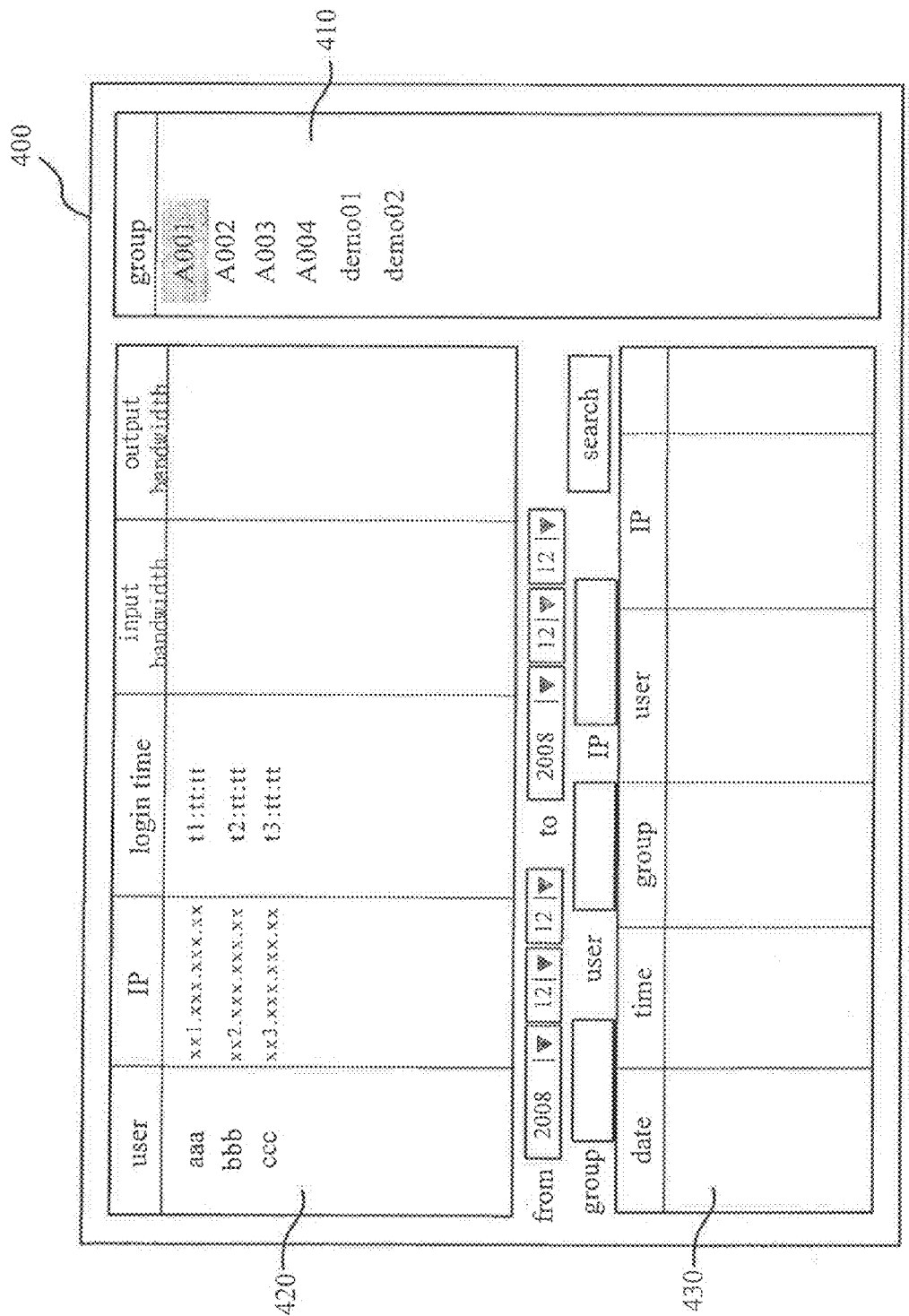
FIG. 6 is a schematic diagram showing a monitoring interface of the online interactive learning and managing system of the present disclosure.
Figure 7:
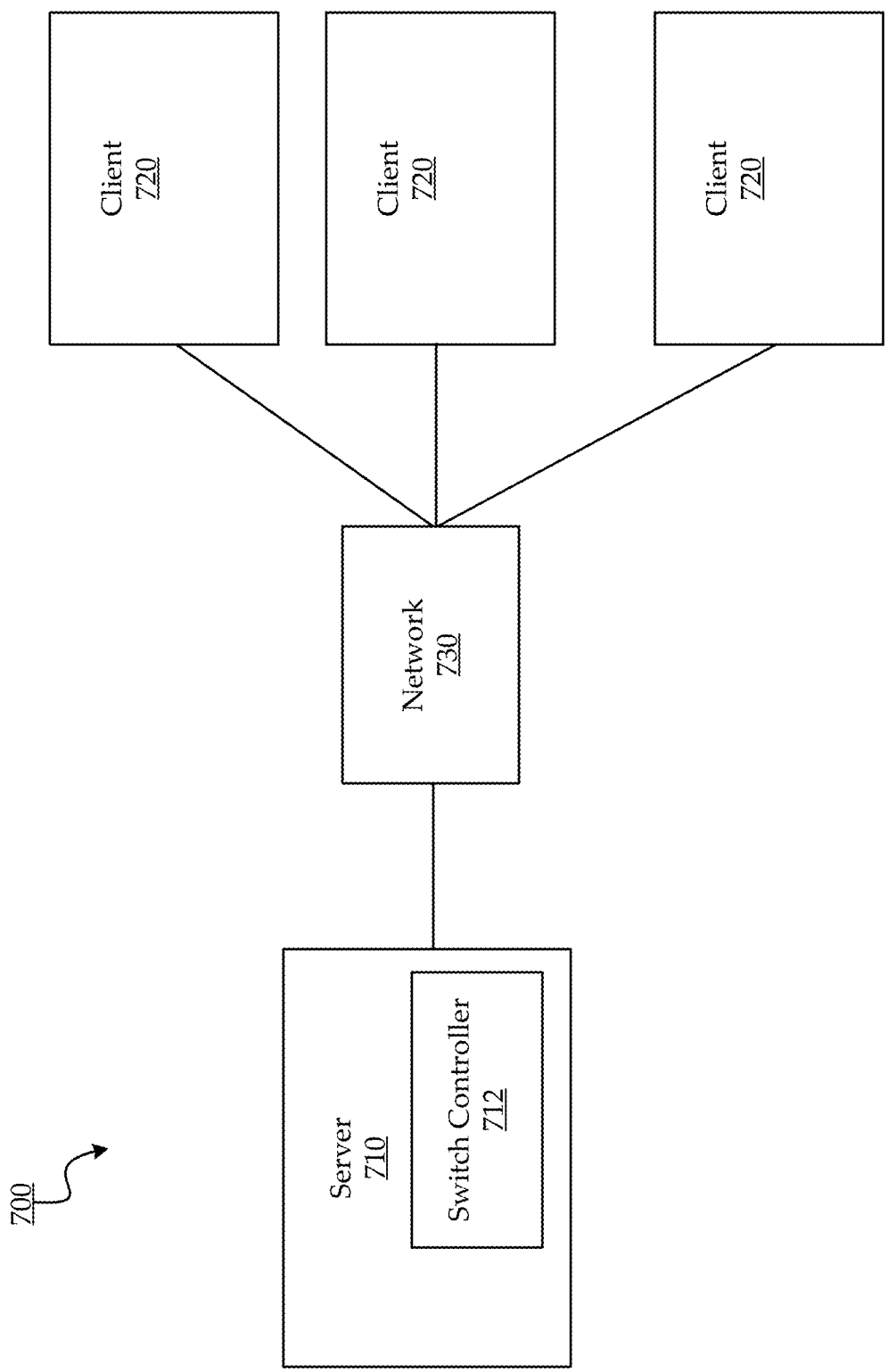
FIG. 7 is a schematic diagram of another online interactive learning and managing system of the present disclosure.

Please refer to FIG. 6. FIG. 6 illustrates the diagram of the monitoring interface 400 of the online interactive learning and managing system 1 of the present disclosure. As shown in FIG. 6, the monitoring interface 400 comprises an online group display area 410 and a connection status display area 420. The online group display area 410 lists all existing groups currently within the system, including each teaching group or each testing group. The connection status display area 420 displays all connection status data of each user of the at least one group chosen by the online group display area 410 in real time. In some embodiments, the connection status data comprises a user account, a connection address, a time of log-in, and an Internet flow bandwidth, but the present disclosure is not restricted to these items.

The monitoring interface 400 further comprises a connection record search area 430. The monitoring interface 400 receives input search conditions (such as date, user name, or teaching group) via the connection record search area 430. The monitoring module 127 receives and uses the input search conditions to search all of the connection status data records of users stored in the connection status storage module 128. The connection status history data records corresponding to the input search conditions are displayed via the monitoring interface 400. Accordingly, the administrator may analyze and obtain all the related information easily.

The design of the online interactive learning and managing system 1 of the present disclosure allows users to directly log into the server 10 to learn interactively via each corresponding personalized operation interface 200a. The administrators logged into the server 10 may control and monitor every user via the managing interface 300 and the monitoring interface 400. When a user has a problem, the user and the administrator may communicate with each other via the personalized operation interface 200a and the managing interface 300. When a connection problem between any user's computer and the server 10 occurs, the administrator may efficiently analyze and identify the problem by the monitoring interface 400.

Although the present disclosure has been explained in relation to its preferred embodiments, it is also of vital importance to acknowledge that many other possible modifications and variations can be made without departing from the spirit and scope of the invention as hereinafter claimed.

FIGS. 7-11 illustrate other exemplary systems and methods for providing an online management and interactive learning system 700. The system 700 includes a server 710 and one or more clients 720 coupled by a network 730, each client having instructions stored in memory and executed by at least one processor for generating, managing, updating, and synchronizing a learning environment. Various example learning environments are shown in FIGS. 12-18. In various environments, the learning environment includes an augmented reality environment, a virtual reality environment, or a combination of both, as will be described in greater detail. By emulating a real world learning environment, such as a classroom, through augmented and virtual reality, the system facilitates users effectively associating learned information with real world objects and ideas by interacting with representations of the real world objects and ideas.

The server 710 manages and transfers the learning environments among the one or more clients 720, both user client(s) and teacher client(s). In some embodiments, each of the one or more clients 720 has a learning environment. The server 710 receives and detects a network quality (otherwise referred to as a network status or network connection status) of each of the one or more clients 720, and dynamically adjusts a synchronization frequency of each learning environment to optimize and stabilize the learning environments. The network quality may comprise information and measurements such as bandwidth, including upload and download bandwidth, latency, jitter, and network route. The server 710 may include at least one processor, a memory, and a database which stores synchronization information for each client. In various embodiments, the synchronization information includes augmented reality information, having one or more face masks and/or stickers corresponding to one or more video signals of a corresponding client, virtual reality information, having object position information and object orientation information, network status information of the client, and the synchronization frequency.

The server 710 further includes and/or hosts a switch controller 712. The switch controller 712 may be software running on the server. The switch controller 712 manages which client 720 has control over the learning environments, otherwise referred to as a controlling client. In various embodiments, the switch controller 712 comprises a default setting for which client is the controlling client, which may include setting a client that first connects to the learning environment of the server 710 as the controlling client. The default setting may instead include setting the most recent client to connect to the learning environment as the controlling client. The switch controller 712 may thereafter receive an update from a consultant or teacher client to change the controlling client to a different client 720. For example, the server 710 receives synchronization information with updated object positional information from one client of the one or more clients 720. The server 710 determines whether the one client has control over the learning environment by checking a user identifier of the one client against a stored user identifier of the controlling client. If the one client has control, otherwise known as a controlling client, the switch controller 712 of the server 710 updates the object position information of the synchronization information and sends the updated synchronization information to each of the one or more clients 720. It is to be understood that the received synchronization information may include other updated information, such as updated object orientation information, etc. If the one client does not have control, the switch controller 712 will not update the synchronization information of the one or more clients 720 with the synchronization information from the one client.

In one or more embodiments, the server 710 determines a synchronization frequency of the one or more clients 720 based on the network status of each client 720. The determination of the synchronization frequency may include calculating an appropriate length of time between each synchronization based on the network status, the synchronization being between the server 710 and a learning environment of each client 720. In other words, the server 710 adjusts a number of times the server 710 and each client 720 synchronize per a predetermined time period. The server 710 facilitates sending and receiving important information to and from the clients 720 without interruption depending on the network quality of each client 720. For example, in response to a network status of a client indicating a small upload/download bandwidth, the server 710 may calculate a longer length of time between synchronizations to facilitate all of the synchronization information being transferred to and from the client. In response to the determination, the server 710 may send updated synchronization information including the determined synchronization frequency, to the one or more clients 720 to adjust the synchronization frequency of the one or more clients 720.

The server 710 may also include some or all of the features as shown in FIG. 2 and previously described herein. For example, an operation interface of a teaching module may form personalized operation interfaces according to each user's personal settings. The operation interface may further comprise the graphical user interface having a graphical representation of the learning environment. Furthermore, the monitoring module may form a monitoring interface that includes information on the server, the network connection status of each client, an internet flow bandwidth of each client, etc. In certain embodiments, the video recording module records the virtual reality learning environment as actions and updates within the virtual reality learning environment are occurring, and further records video and/or audio of the user and initialization of the virtual reality learning environment. The video recording module may record the object position and orientation information in the virtual reality learning environment over time, such that a user viewing the playback of the recording may manipulate one or more objects in the virtual reality learning environment after the virtual learning environment is initiated.

In various embodiments, each client 720 includes and/or hosts a client browser that manages and displays the learning environment using WebGL or other suitable library or application program interface (API). For example, the client browser transforms object position information and object orientation information into a 2D or 3D graphic rendering of objects in the learning environment. In certain embodiments, the transformation is performed by WebGL, such that each object in the learning environment is defined in WebGL and is placed at a position and orientation according to the object position information and object orientation information. The client browser also receives user inputs from a user input device such as a keyboard, mouse, touch screen, or other suitable input device, converts the user inputs into updated object position information and updated object orientation information, and sends updated synchronization information having the updated object position information and updated object orientation information to the server 710. The client may also include some or all of the features of computer 20 shown and described above and in FIGS. 1-6.

Figure 8:
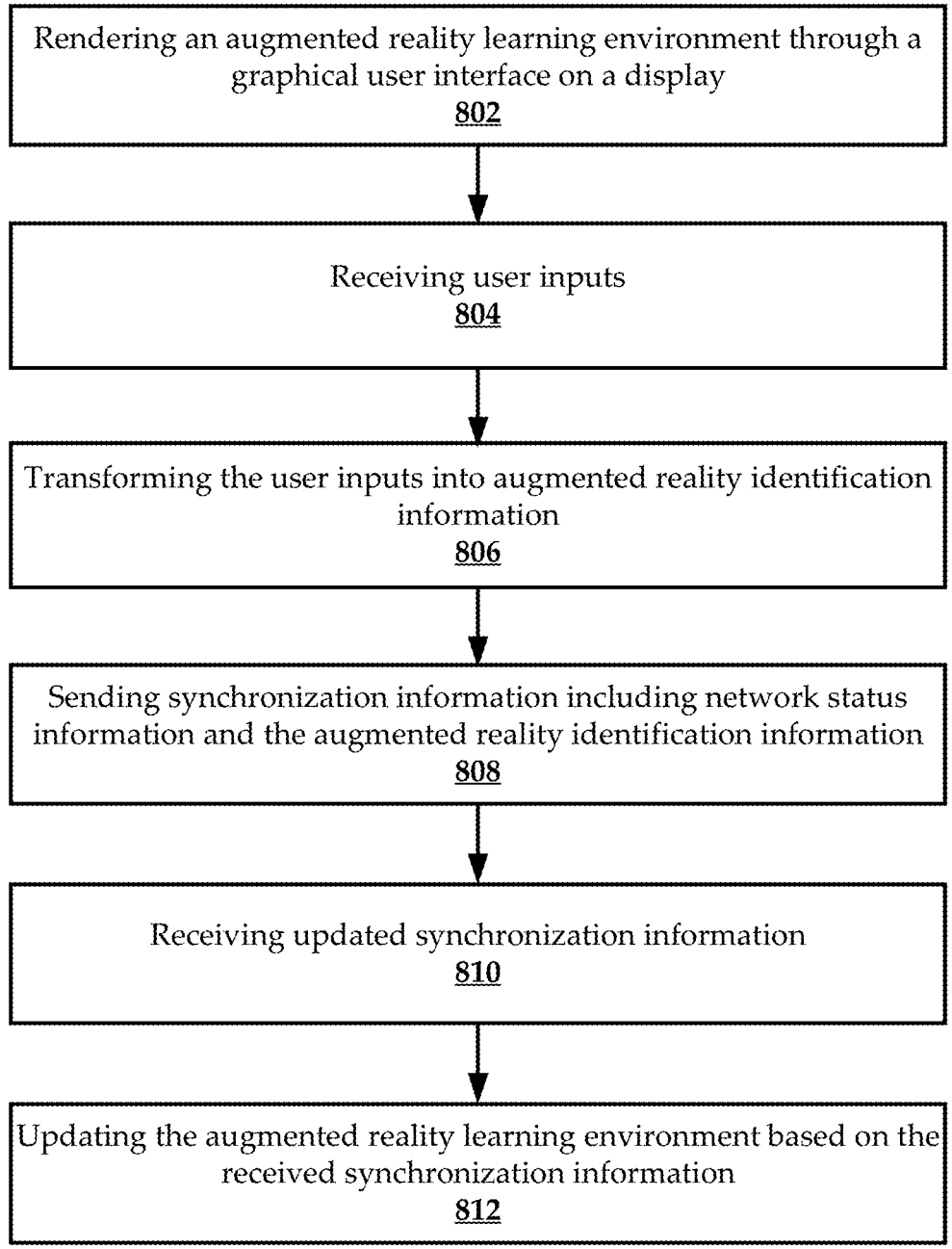
FIG. 8 is a flow diagram of a method for generating and synchronizing an augmented reality learning environment.

FIG. 8 shows an exemplary method 800 for generating and synchronizing an augmented reality learning environment. For example, the one or more clients 720 in FIG. 7 may execute method 800 to facilitate student and teacher interaction through the augmented reality learning environment. In some embodiments, the method 800 proceeds with rendering an augmented reality learning environment through a graphical user interface on a display in step 802. The augmented reality learning environment comprises one or more video signals corresponding to other students or other teachers. The graphical user interface may comprise a plurality of selectable face masks and/or stickers for overlaying on the one or more video signals. The stickers may comprise any number of graphics, sprites, animations, etc.

In step 804, the method proceeds with receiving user inputs. The received user inputs may correspond to a selection of a client of the one or more clients and a selection of a face mask or a sticker. Step 806 includes transforming the user inputs into augmented reality identification information, the augmented reality identification information having the selection of the client and the selection of the face mask or the sticker. In step 808, the method sends synchronization information to the server. The synchronization information includes network status information and the augmented reality identification information.

At step 810, the method proceeds with receiving synchronization information from the server. The received synchronization information includes a synchronization frequency and further augmented reality identification information. The further augmented reality identification information includes one or more face masks and/or stickers to be applied to one or more corresponding client video signals. At step 812, the augmented reality learning environment is updated based on the received synchronization information. The updating includes applying the one or more face masks and/or stickers to the corresponding client video signal. The updating may further include updating the synchronization frequency based on the received synchronization frequency. The method may additionally include sending further synchronization information after waiting a particular length of time from the previously sent synchronization information based on the received synchronization frequency.

In various embodiments, the applying the one or more face masks and/or stickers uses facial recognition on the one or more video signals to identify a location and orientation of a face, and facial features such as eyes, nose, ears, etc., of the corresponding user. For example, the server performs facial recognition by identifying one or more facial features using algorithmic models. The algorithmic models, or machine learning algorithms, are trained on images of human faces associated with location and orientation information of previously identified facial features, facilitating the algorithmic models to determine the location and orientation of facial features in new images of human faces. The server performs facial recognition on an image by image basis in each video. The location and orientation are updated continually in real-time in response to movement of the user relative to the video signal. The applying step may further include updating a shape and/or orientation of the one or more applied face masks and/or stickers according to a location, size, and orientation of the facial features. For example, the updating may include determining an appropriate size of the one or more applied face masks based on a cheek width, eye separation width, chin location, etc. of the user's face in each image of the video.

In one or more embodiments, the received user input includes receiving a clear mask option through the graphical user interface. The sent augmented reality identification information further includes the clear mask option, which facilitates removing face masks from the augmented reality learning environment in response to a user selecting the clear mask option. In certain embodiments, the received updated synchronization information includes information indicating the clear mask option has been selected for one or more of the applied face masks. The updating the augmented reality learning environment further includes removing one or more of the applied face masks based on the received updated synchronization information.

Figure 9:
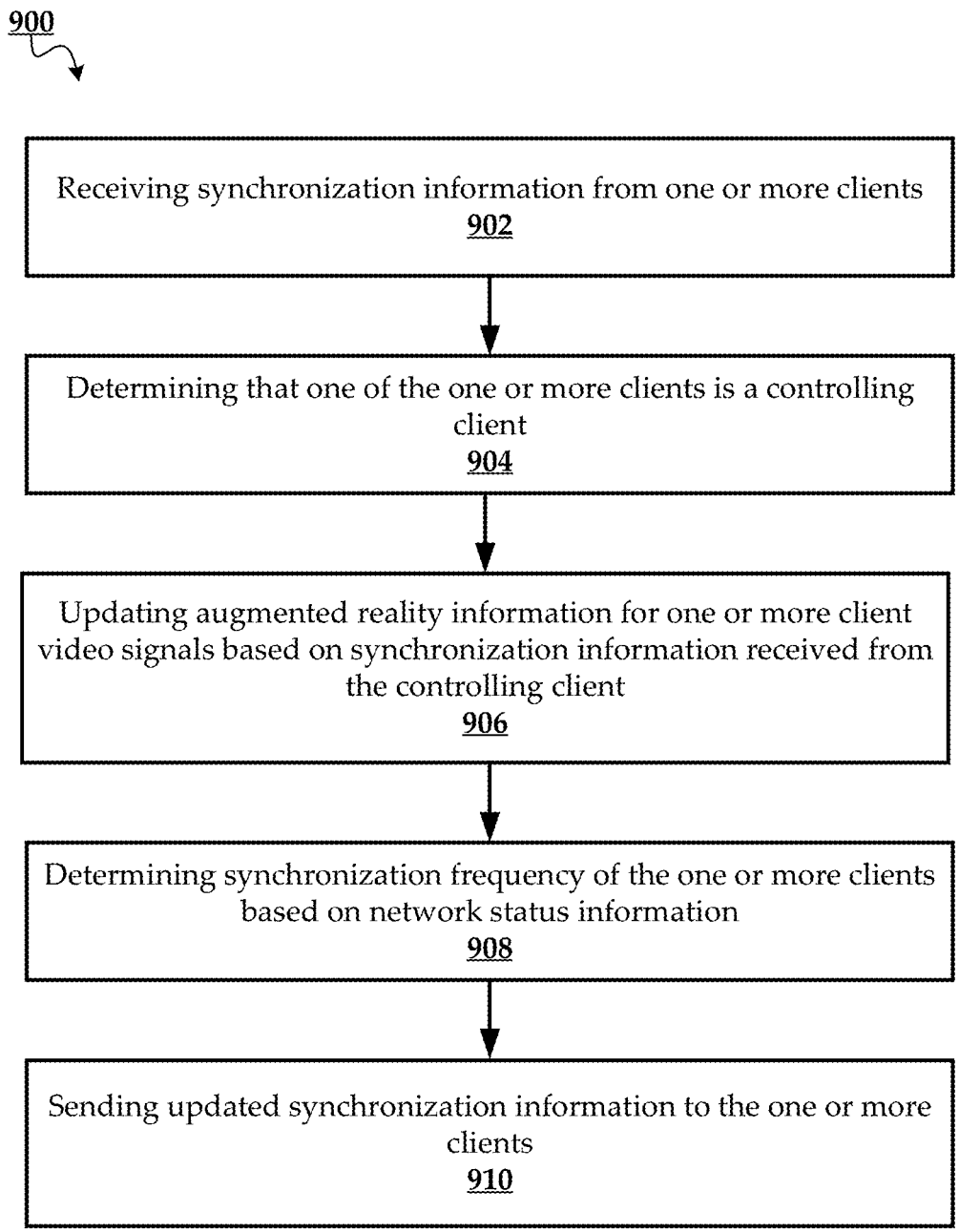
FIG. 9 is a flow diagram of a method for synchronizing one or more clients each having an augmented reality learning environment.

FIG. 9 depicts an exemplary method 900 for synchronizing one or more client browsers each having an augmented reality learning environment. In some embodiments, the method 900 proceeds with receiving synchronization information from one or more clients at step 902. The synchronization information includes network status information of the client, a synchronization frequency of the client, and augmented reality information having one or more augmented reality identifiers. The one or more augmented reality identifiers may comprise one or more face masks and/or stickers corresponding to one or more video signals from a corresponding client. The corresponding client may be the one or more clients sending the synchronization information at step 910, or any of the other clients coupled to the system.

At step 904, the method proceeds with determining that one of the one or more clients is a controlling client. Step 906 comprises updating augmented reality information for one or more client video signals based on synchronization information received from the controlling client. For example, if the synchronization information from the controlling client, a teacher or a student, included a particular face mask corresponding to a corresponding client, the teacher, the student, or another student, then the augmented reality information of the corresponding client is updated to reflect that the corresponding client should apply the particular face mask.

Step 908 comprises determining synchronization frequency of each of the one or more clients based on respective network status information received in the synchronization information. The determining may include calculating an appropriate length of time between each synchronization depending on the network quality of each client, such that important information is sent between the server and clients without interruption. It is to be understood that steps 904 and 906 may occur before, after, or simultaneously with step 908. Step 910 comprises sending synchronization information including the determined synchronization frequencies and updated augmented reality information, to the one or more clients.

Figure 10:
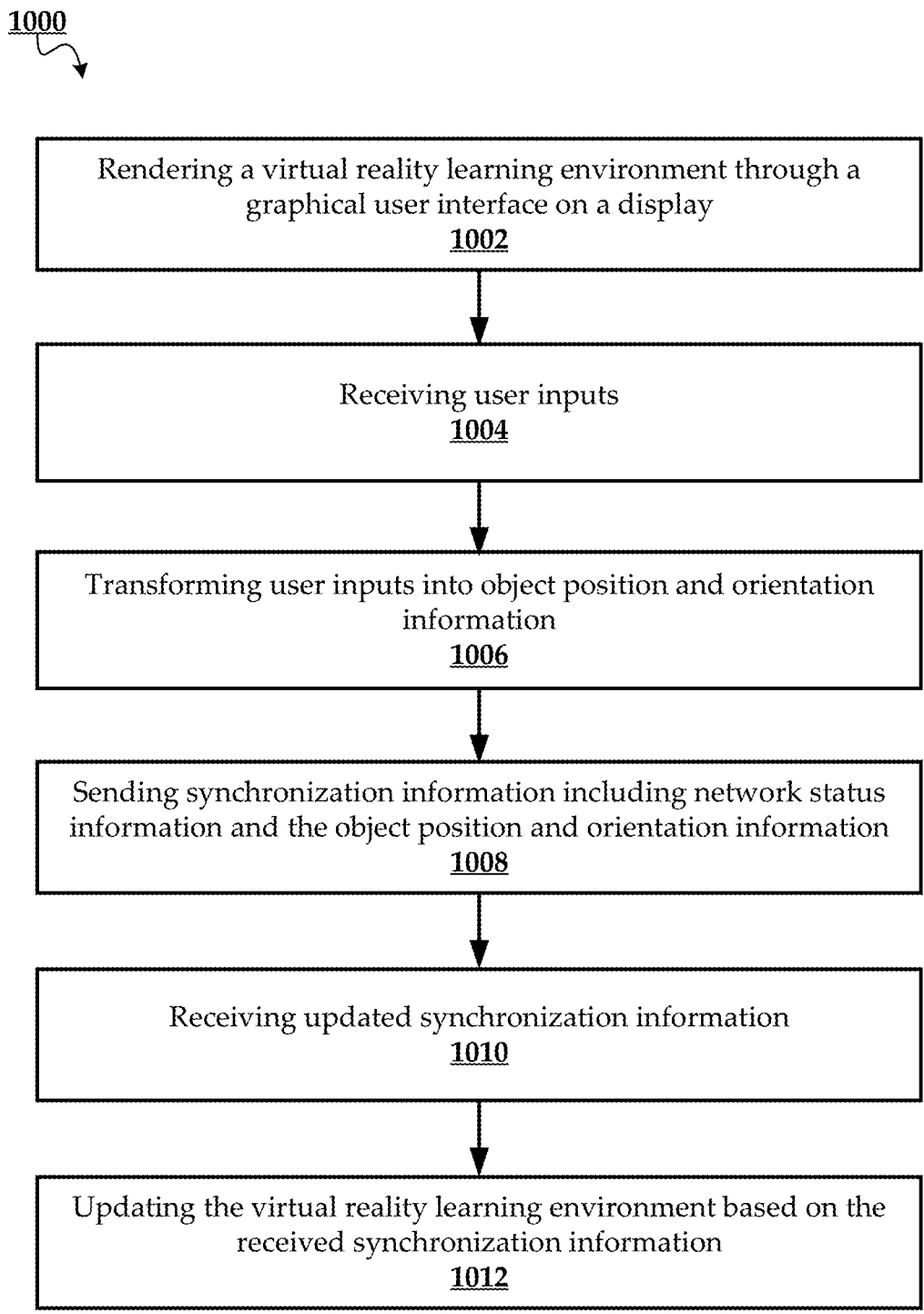
FIG. 10 is a flow diagram of a method for generating and synchronizing a virtual reality learning environment.

FIG. 10 shows an exemplary method 1000 for generating and synchronizing a virtual reality learning environment. In various embodiments, the one or more clients 720 in FIG. 7 may execute method 1000 to facilitate student and teacher interaction through the virtual reality learning environment. For example, the virtual reality learning environment may comprise a 3D scene having a plurality of 3D objects. In some embodiments, the one or more clients each comprises a virtual reality device, such as a virtual reality headset, to display the virtual reality learning environment. The field of view of the learning environment displayed in the virtual reality headset may be the field of view of the learning environment as displayed in the client browser.

In some embodiments, the method 1000 proceeds with rendering a virtual reality learning environment through a graphical user interface on a display in step 1002. The graphical user interface may comprise one or more video signals corresponding to other students or other teachers, and the virtual reality learning environment. The graphical user interface may further comprise a status window showing a status for each coupled client, and a chat window. The graphical user interface may comprise different combinations thereof based on an authorization of the user, for example a teacher may have a graphical user interface having the status window while a student user may not.

A step 1004 comprises receiving user inputs. The received user inputs may correspond to introducing a 3D scene, an interaction with the 3D scene including an interaction with one or more 3D objects, initializing a virtual mini-game, etc. Step 1006 comprises transforming the user inputs into object position and orientation information. For example, the user may input a click, tap, or other suitable input corresponding to a 3D object, such as a representation of an ambulance. The input is transformed into object position and orientation information of the representation of the ambulance. Step 1008 comprises sending synchronization information to the server. The synchronization information includes object position information, object orientation information, network status information of the client, and synchronization frequency of the client.

A step 1010, the method proceeds with receiving synchronization information from the server. The received synchronization information includes a synchronization frequency and updated object position and orientation information. The updated object position and orientation information may correspond to one or more 3D objects of the 3D scene. At step 1012, the virtual reality learning environment is updated based on the received synchronization information. The updating includes updating object information for the one or more 3D objects based on the received updated object position and orientation information. In some embodiments, the received synchronization information further includes a signal to play a sound effect and/or animation. The updating may further include updating the synchronization frequency based on the received synchronization frequency. The method may additionally include sending further synchronization information after waiting a particular length of time from the previously sent synchronization information based on the received synchronization frequency.

Figure 11:
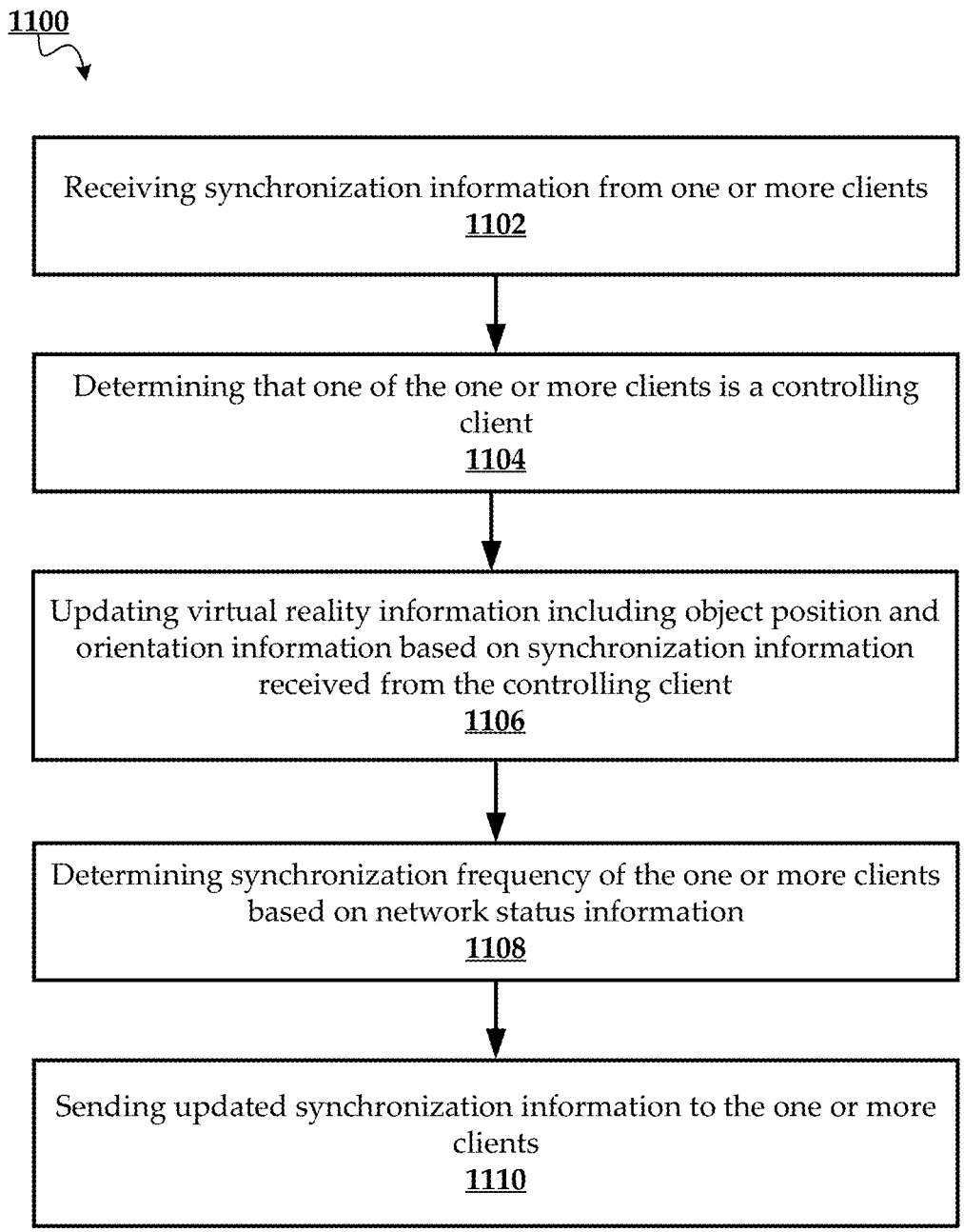
FIG. 11 is a flow diagram of a method for synchronizing one or more clients each having a virtual reality learning environment.

FIG. 11 depicts an exemplary method 1100 for synchronizing one or more client browsers each having a virtual reality learning environment. In some embodiments, the method 1100 proceeds with receiving synchronization information from one or more clients at step 1102. The synchronization information includes network status information of the client, a synchronization frequency of the client, and object position and orientation information. The object position and orientation information may correspond to one or more 3D objects in a 3D scene.

Step 1104 comprises determining that one of the one or more clients is a controlling client. Step 1106 comprises updating virtual reality information including object position and orientation information based on synchronization information received from the controlling client. The synchronization information may further include a signal to introduce the 3D scene, for example a teacher introducing 3D scene content and switching a view of one or more student graphical user interfaces to the 3D scene. Updating the virtual reality information may include a signal to display the 3D scene on one or more clients.

Step 1108 comprises determining synchronization frequency of each of the one or more clients based on respective network status information received in the synchronization information. The determining may include calculating an appropriate length of time between each synchronization depending on the network quality of each client, such that important information is sent between the server and clients without interruption. It is to be understood that steps 1104 and 1106 may occur before, after, or simultaneously with step 1108. Step 1110 comprises sending synchronization information including the determined synchronization frequencies and updated virtual reality information, to the one or more clients.

It is to be understood that the one or more clients may perform either method 800, method 1000, or both methods 800 and 900 to generate and synchronize an augmented reality and virtual reality learning environment. Likewise, the server may perform either method 900, method 1100, or both methods 900 and 1100 to synchronize augmented reality and virtual reality learning environments.

Figure 12:
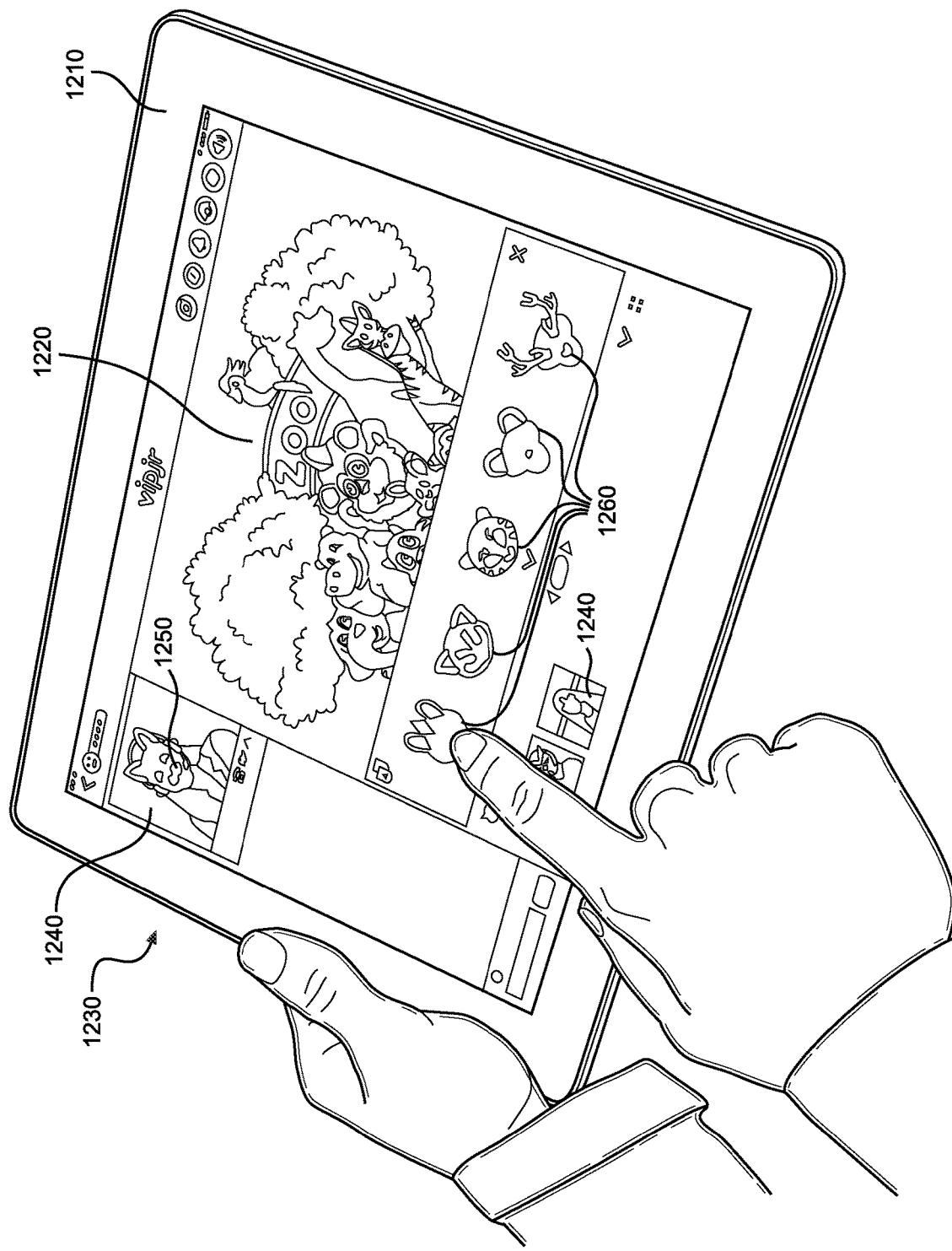
FIG. 12 is an exemplary client device having a graphical user interface displaying an augmented reality learning environment, according to the present disclosure.

FIG. 12 depicts an augmented reality learning environment 1230 displayed on a graphical user interface 1220 of a client device 1210 according to the present disclosure. The graphical user interface 1220 comprises one or more video signals 1240 corresponding to one or more client devices, including other client devices and the client device 1210. The graphical user interface 1220 may further comprise a plurality of selectable face masks and/or stickers 1260. In various embodiments, in response to selecting one of the plurality of selectable face masks and/or stickers 1260, the client device 1210 will augment a video signal of the one or more video signals 1240 with the face mask and/or sticker, such as face mask 1250. For example, if an instructor is utilizing the augmented reality learning environment 1230 to teach the names of various animals in a different language, the student or instructor may select a face mask corresponding to an animal which is described in the different language.

Figure 13:
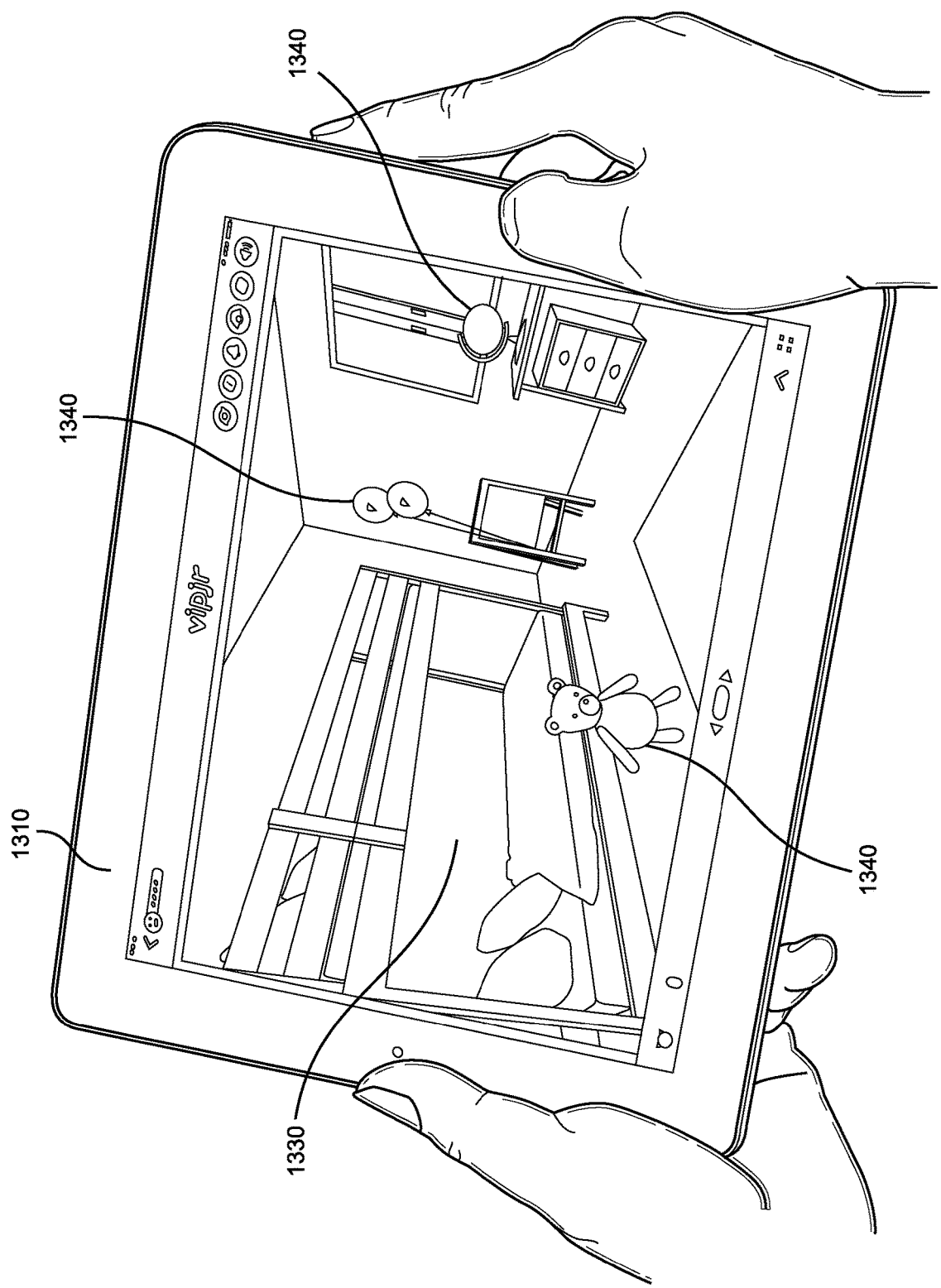
FIGS. 13-17 illustrate various virtual reality learning environments, according to the present disclosure.

FIG. 13 illustrates an exemplary virtual reality learning environment 1330 displayed on a graphical user interface 1320 of a client device 1310 according to the present disclosure. The virtual reality learning environment 1330 may comprise one or more objects 1340, the client device 1310 storing object position information and object orientation information for each object 1340. The virtual reality learning environment 1330 may be updated and synchronized with virtual reality learning environments of a central server and other client devices using one or more of the methods described herein.

Figure 14:
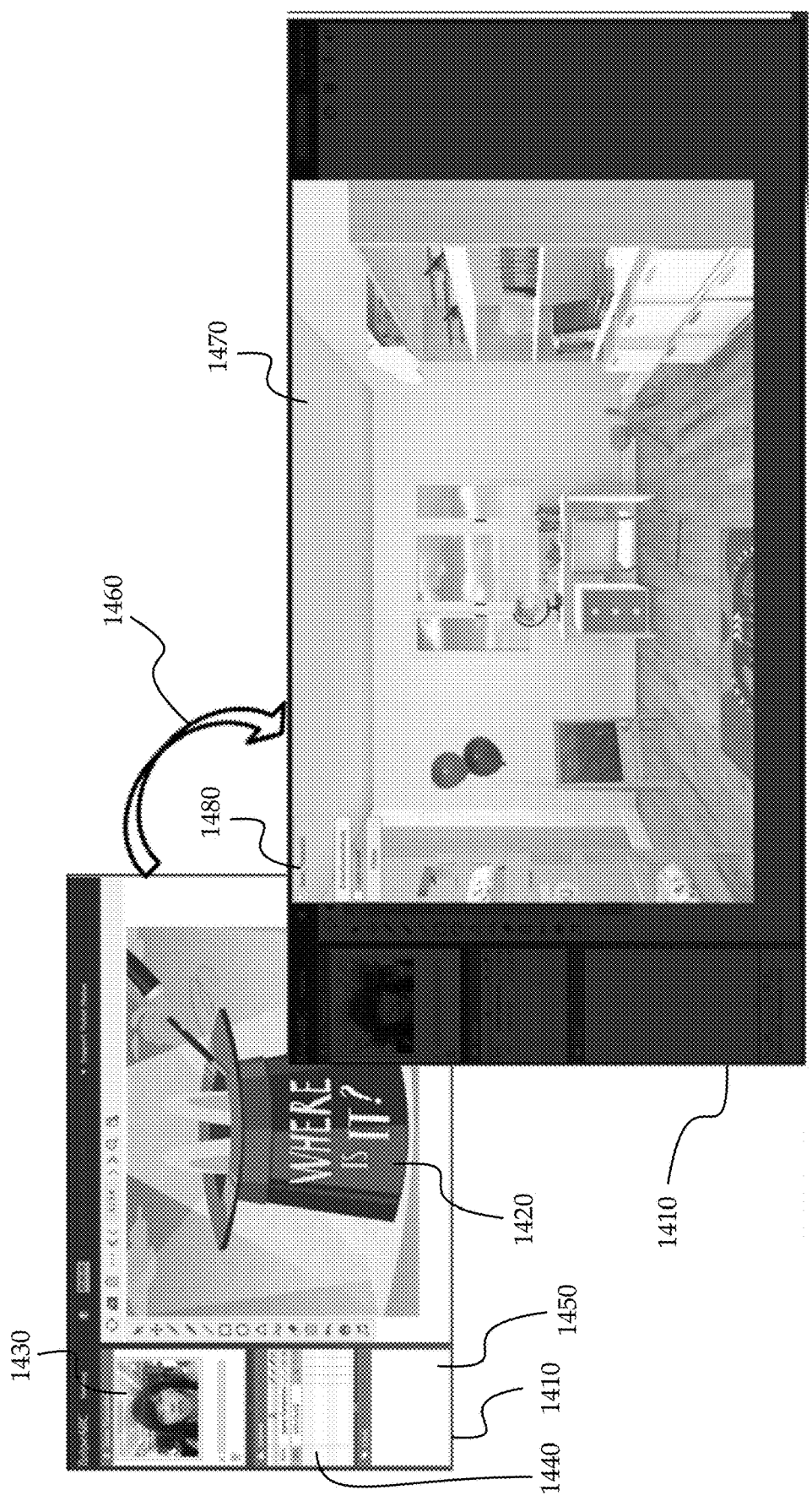
Figure 15:
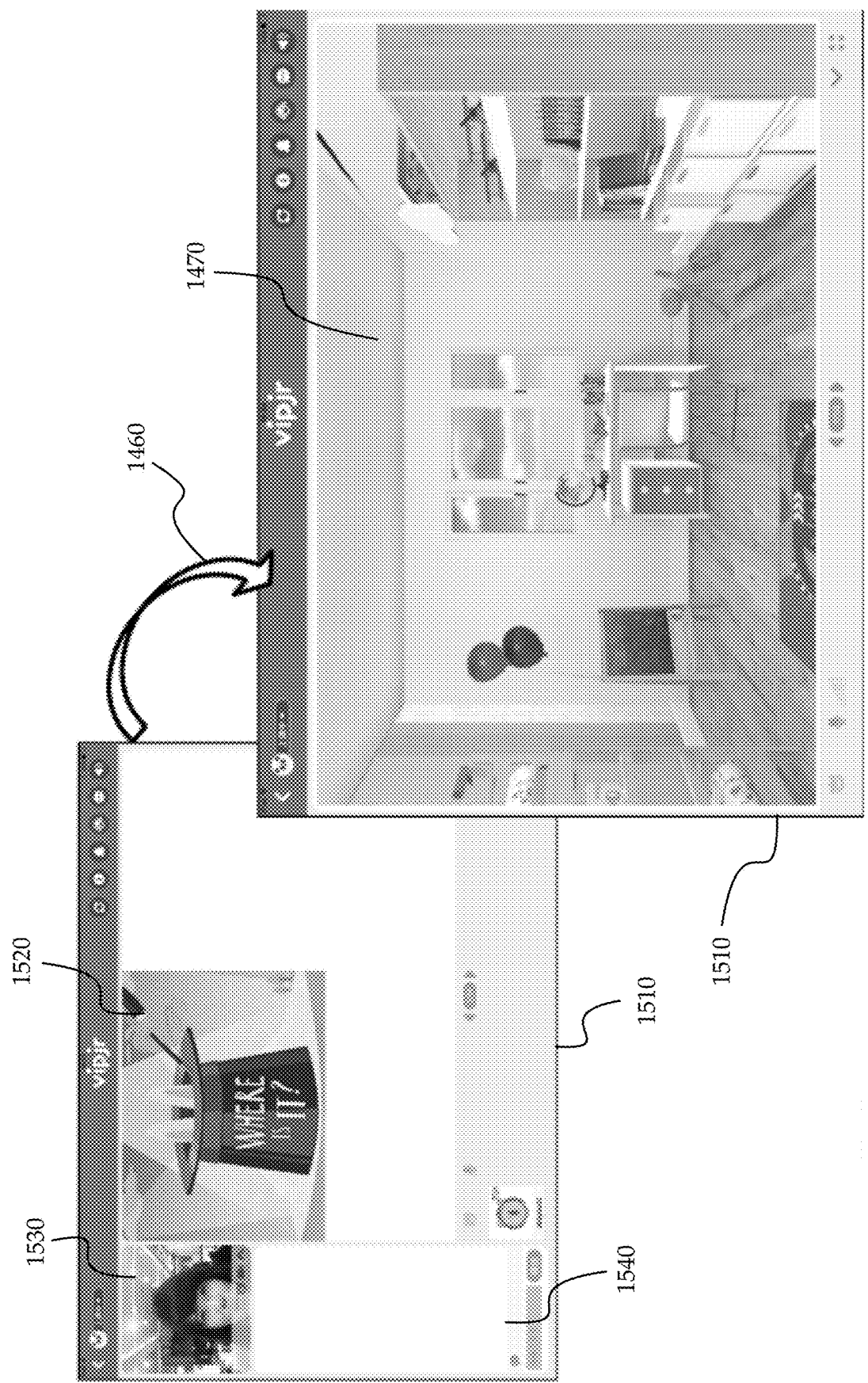

FIGS. 14-15 shows a consultant introducing 3D scene content to a virtual reality learning environment, and initializing the virtual reality learning environment on a graphical user interface of a client device. A graphical user interface 1410 of a consultant client device depicts a scene 1420 currently displayed on one or more graphical user interfaces 1510 of one or more student user client devices. The graphical user interface 1410 may further comprise one or more video signals 1430, corresponding to one or more student user client devices, a status window 1440, and a chat window 1450. The graphical user interface 1510 of the student user client device comprises a video signal 1530, corresponding to the consultant client device, a scene 1520, corresponding to the scene 1420, and a chat window 1540. The consultant may trigger initialization 1460 of a virtual reality learning environment 1470 using any suitable user input or gesture. In some embodiments, the graphical user interface 1410 comprises one or more buttons, checkboxes, or other suitable controls 1480 to determine which of the one or more student user client devices displays the virtual reality learning environment 1470.

Figure 16:
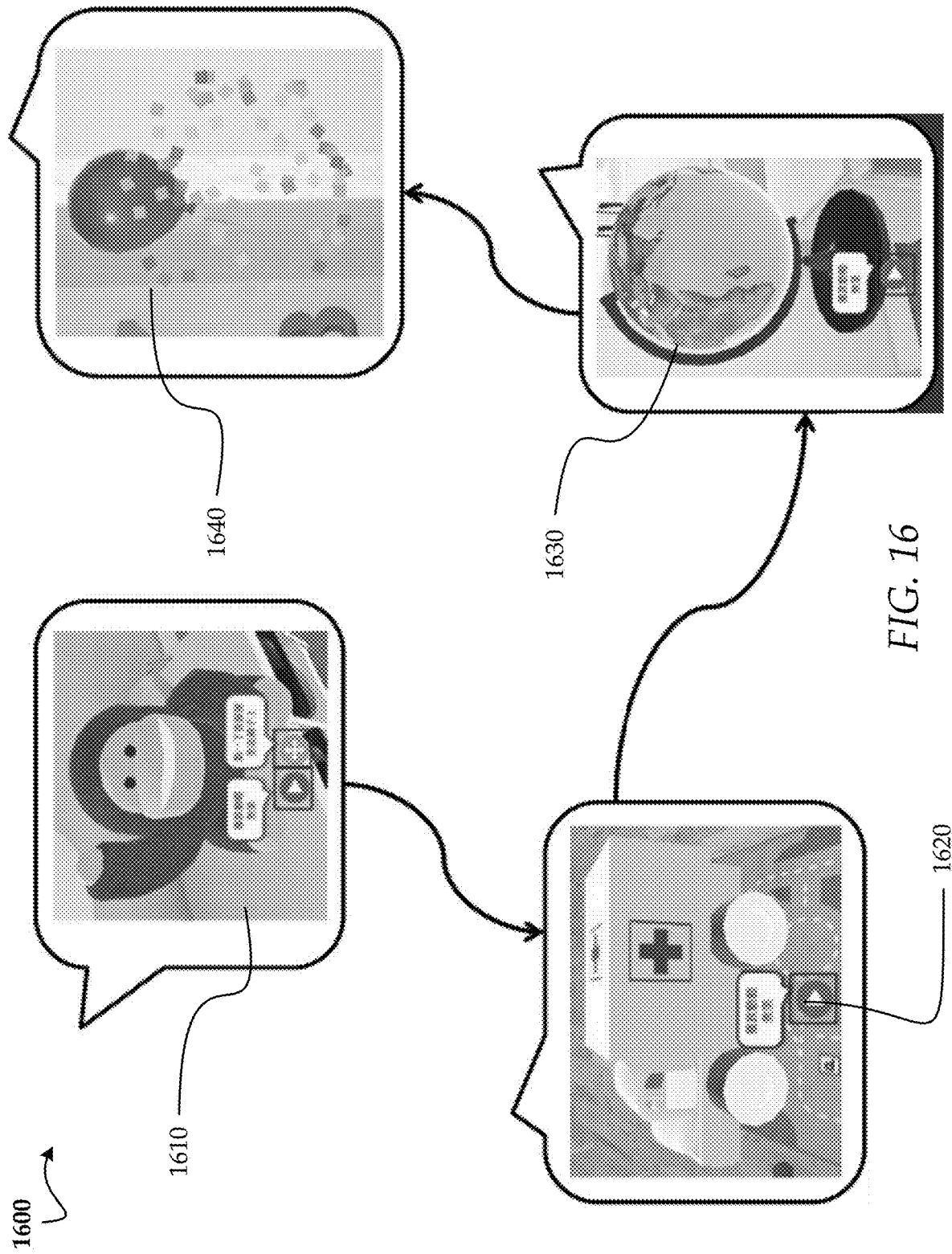
Figure 17:
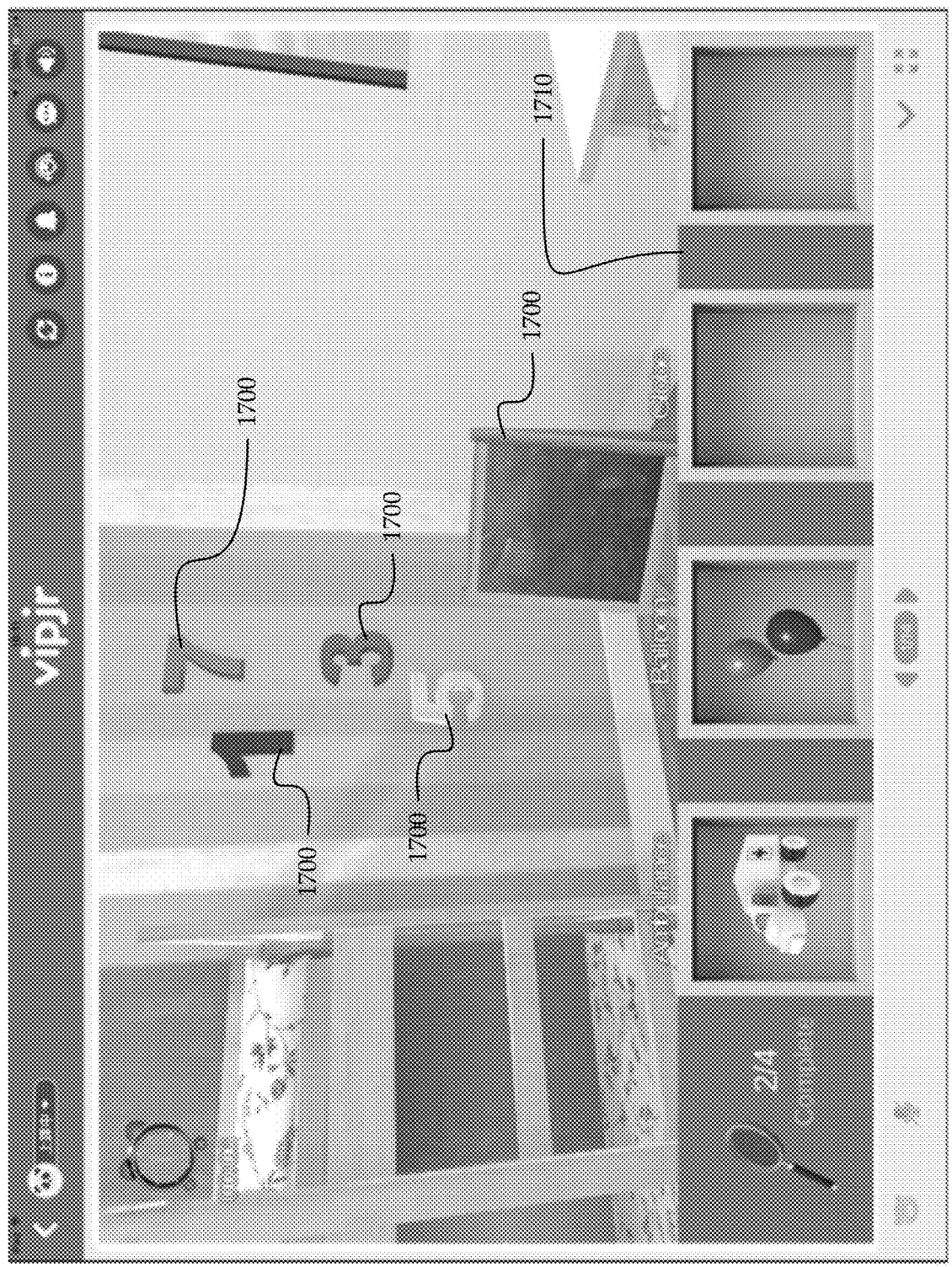

FIGS. 16-17 show a plurality of interactive objects 1600 that may be included in a virtual reality learning environment. In response to receiving a click, tap, or other suitable user input on the interactive objects 1600, the client device may display, via the graphical user interface, one or more animations and/or play one or more audio signals. For example, interacting with a gorilla object 1610 may show a dynamic effect and may be moved in the virtual reality learning environment. Interacting with an ambulance object 1620 may cause the graphical user interface to display an animation in which the ambulance circles around a room and play a siren sound effect. Interacting with a globe object 1630 may cause the graphical user interface to display a spinning animation. Interacting with a balloon object 1640 may cause the graphical user interface to display a popping animation and play a popping sound effect. FIG. 17 shows further interactive objects 1700 and an inventory user interface 1710.

The flowchart and block diagrams in the Figures illustrate the architecture, functionality, and operation of possible implementations of systems, methods and computer program products according to various embodiments of the present technology. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The description of the present technology has been presented for purposes of illustration and description, but is not intended to be exhaustive or limited to the invention in the form disclosed. Many modifications and variations will be apparent to those of ordinary skill in the art without departing from the scope and spirit of the invention. Exemplary embodiments were chosen and described in order to best explain the principles of the present technology and its practical application, and to enable others of ordinary skill in the art to understand the invention for various embodiments with various modifications as are suited to the particular use contemplated.

What is claimed is:

1. A method for generating and synchronizing an augmented reality learning environment, the method comprising:
   rendering an augmented reality learning environment through a graphical user interface;
   receiving one or more user inputs;
   transforming the user inputs into augmented reality identification information;
   sending synchronization information including network status information and the augmented reality identification information, wherein the synchronization information further includes a synchronization frequency that comprises a length of time between synchronization events based on the network status information, the network status information indicating a small upload/download bandwidth of a client;
   receiving updated synchronization information;
   updating the augmented reality learning environment based on the received synchronization information, the updated synchronization information includes an update to the synchronization frequency including a longer length of time between the synchronization events to facilitate all of the synchronization information being transferred to and from the client.

2. The method as recited in claim 1, wherein the augmented reality learning environment comprises one or more video signals, each video signal corresponding to one or more clients.

3. The method as recited in claim 2, wherein the augmented reality identification information includes a selection of a face mask or sticker corresponding to a video signal of the one or more video signals.

4. The method as recited in claim 3, further comprising identifying a location and an orientation of one or more facial features in the video signal using facial recognition, and updating a location and an orientation of the face mask or sticker based on the identified location and orientation of the one or more facial features.

5. The method as recited in claim 3, wherein the updating the augmented reality learning environment includes applying the face mask or sticker to the corresponding video signal.

6. A method for generating and synchronizing a virtual reality learning environment, the method comprising:
   rendering a virtual reality learning environment through a graphical user interface;
   receiving one or more user inputs;
   transforming the user inputs into object position and orientation information;
   sending synchronization information including network status information and the object position and orientation information, wherein the synchronization information further includes a synchronization frequency that comprises a length of time between synchronization events based on the network status information, the network status information indicating a small upload/download bandwidth of a client;
   receiving updated synchronization information;
   updating the virtual reality learning environment based on the received synchronization information, the synchronization information includes an update to the synchronization frequency including an increase to the length of time between the synchronization events to facilitate all of the synchronization information being transferred to and from the client.

7. The method as recited in claim 6, wherein the virtual reality learning environment comprises a 3D scene having one or more 3D objects.

8. The method as recited in claim 7, wherein the received one or more user input corresponds to a 3D object of the one or more 3D objects.

9. The method as recited in claim 6, wherein the updated synchronization information includes a signal to play a sound effect or an animation.

10. The method as recited in claim 6, wherein the updated synchronization information includes updated object position and orientation information, the updating the virtual reality learning environment including updating a position and an orientation of a 3D object.

11. The method as recited in claim 6, wherein the rendering includes rendering the virtual reality learning environment via a virtual reality headset.

12. A method for synchronizing learning environments of one or more clients, the method comprising:
   receiving synchronization information from one or more clients;
   determining a controlling client of the one or more clients;
   updating learning environment information for the one or more clients based on synchronization information received from the controlling client;
   determining a synchronization frequency of each of the one or more clients based on network status information, the synchronization frequency comprises a length of time between synchronization events based on the network status information, the network status information indicating a small upload/download bandwidth of a client;
   sending updated synchronization information including the updated learning environment information and the determined synchronization frequency to the one or more clients, the updated synchronization information including an update to the synchronization frequency including an increase to the length of time between the synchronizations events to facilitate all of the synchronization information being transferred to and from a client.

13. The method as recited in claim 12, wherein the synchronization information includes augmented reality identifiers indicating one or more face masks, each face mask corresponding to a video signal of a respective client.

14. The method as recited in claim 13, wherein the updated synchronization information further includes the augmented reality identifiers.

15. The method as recited in claim 12, wherein the synchronization information includes object position and orientation information of one or more 3D objects of a 3D scene.

16. The method as recited in claim 15, wherein updating the learning environment includes updating a position and an orientation of one or more 3D objects in the learning environment based on the synchronization information received from the controlling client.

17. The method as recited in claim 12, wherein determining a controlling client includes providing a switch controller to manage which client of the one or more clients is the controlling client.

* * * * *